United States Patent [19]
Ishii et al.

[11] Patent Number: 5,222,549
[45] Date of Patent: Jun. 29, 1993

[54] CONDENSER/EVAPORATOR

[75] Inventors: Hiroshi Ishii, Tokyo; Hiroo Tsuchiya, Kanagawa; Teruji Kaneko, Kanagawa; Tomio Kura, Kanagawa; Ikuo Fujita, Kanagawa; Yoshitoyo Ohkubo, Kanagawa; Takashi Matsuoka, Tokyo, all of Japan

[73] Assignee: Japan Oxygen Co., Ltd., Tokyo, Japan

[21] Appl. No.: 465,246

[22] PCT Filed: Jul. 4, 1989

[86] PCT No.: PCT/JP89/00668
§ 371 Date: Apr. 27, 1990
§ 102(e) Date: Apr. 27, 1990

[87] PCT Pub. No.: WO90/00243
PCT Pub. Date: Jan. 11, 1990

[30] Foreign Application Priority Data

Jul. 4, 1988 [JP] Japan .................. 63-166182
Oct. 4, 1988 [JP] Japan .................. 63-250481
Mar. 3, 1989 [JP] Japan .................. 1-51380
May 22, 1989 [JP] Japan .................. 1-128568
Jun. 15, 1989 [JP] Japan .................. 1-153170

[51] Int. Cl.[5] ............................. F25J 3/04
[52] U.S. Cl. .................. 165/110; 165/111; 165/166
[58] Field of Search ............. 165/110, 111, 116, 166, 165/911, 913; 62/36

[56] References Cited

U.S. PATENT DOCUMENTS 4,153,501  5/1979  Fink et al. .................. 159/49
4,372,764  2/1983  Theobald ..................... 62/13
4,715,433  12/1987  Schwarz et al. ............ 165/110

FOREIGN PATENT DOCUMENTS 49-37627  10/1974  Japan .
60-253782  12/1985  Japan .
63-267877  11/1988  Japan .

Primary Examiner—Allen J. Flanigan
Attorney, Agent, or Firm—Armstrong, Westerman, Hattori, McLeland & Naughton

[57] ABSTRACT

A condenser-evaporator is constituted in such a way that first fluid chambers and second fluid chambers are alternately formed by multiple vertical partitions and a liquid in the first fluid chambers exchange heat with a fluid in the second fluid chambers, characterized in that a plurality of heat exchanger plates are arranged in multiple stages in the first fluid chambers to form a liquid passage having one end open, a plurality of liquid reservoirs communicating with the liquid passage and having a top open are provided in multiple stages on a side of the other end of the liquid passage, and a liquid is introduced in the liquid passage for heat exchange while being supplied to the liquid reservoir in each stage. Accordingly, the depth of the liquid is shallow so as to prevent a boiling point elevation due to the liquid head pressure, thus improving the efficiency of the condenser-evaporator.

17 Claims, 21 Drawing Sheets

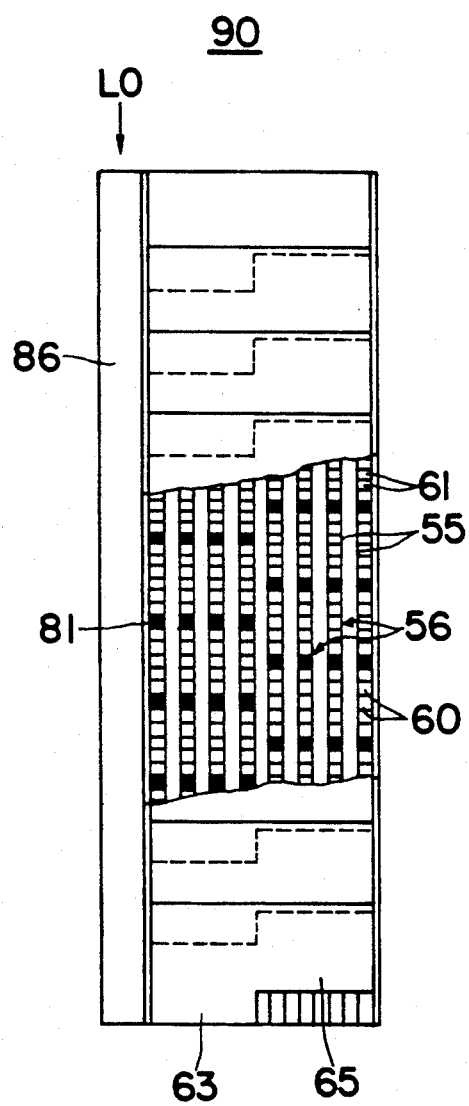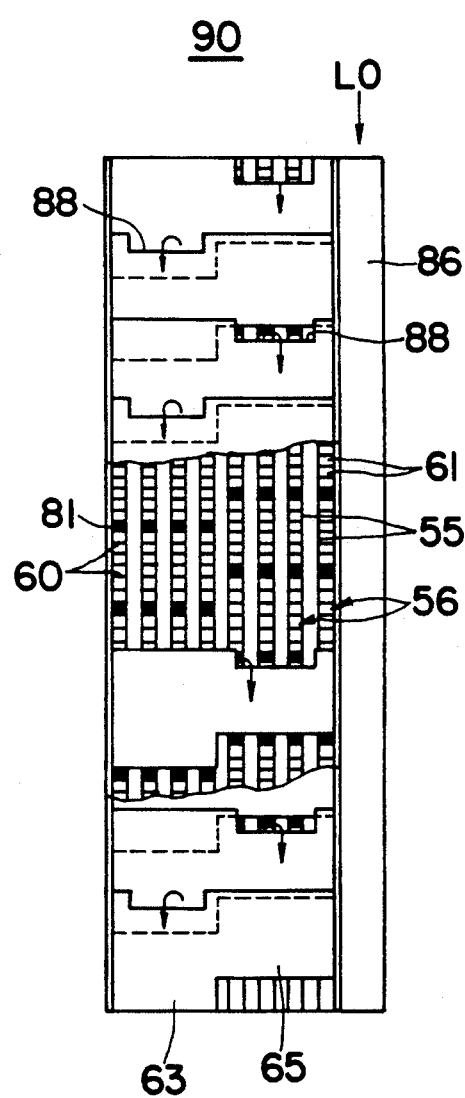

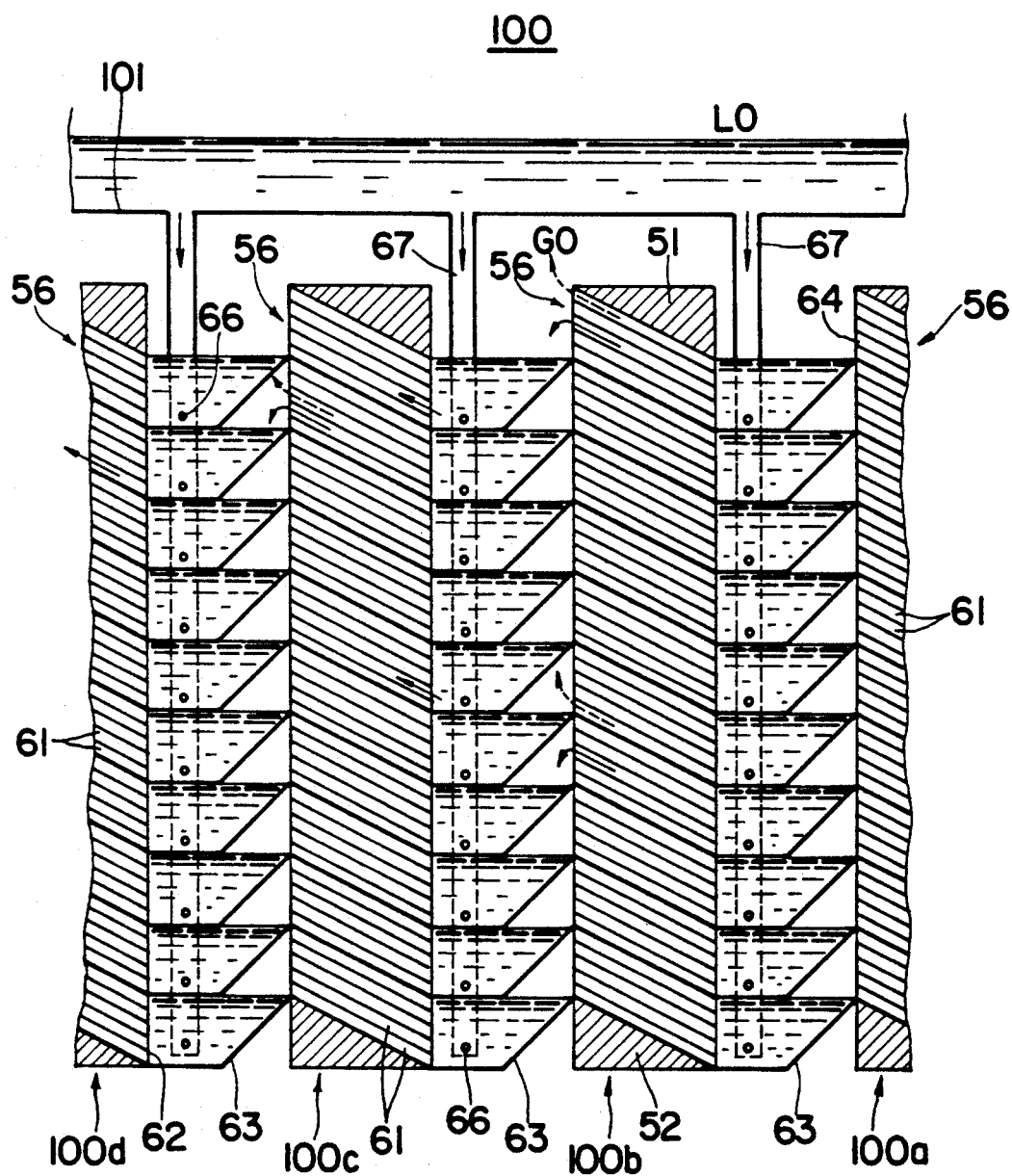

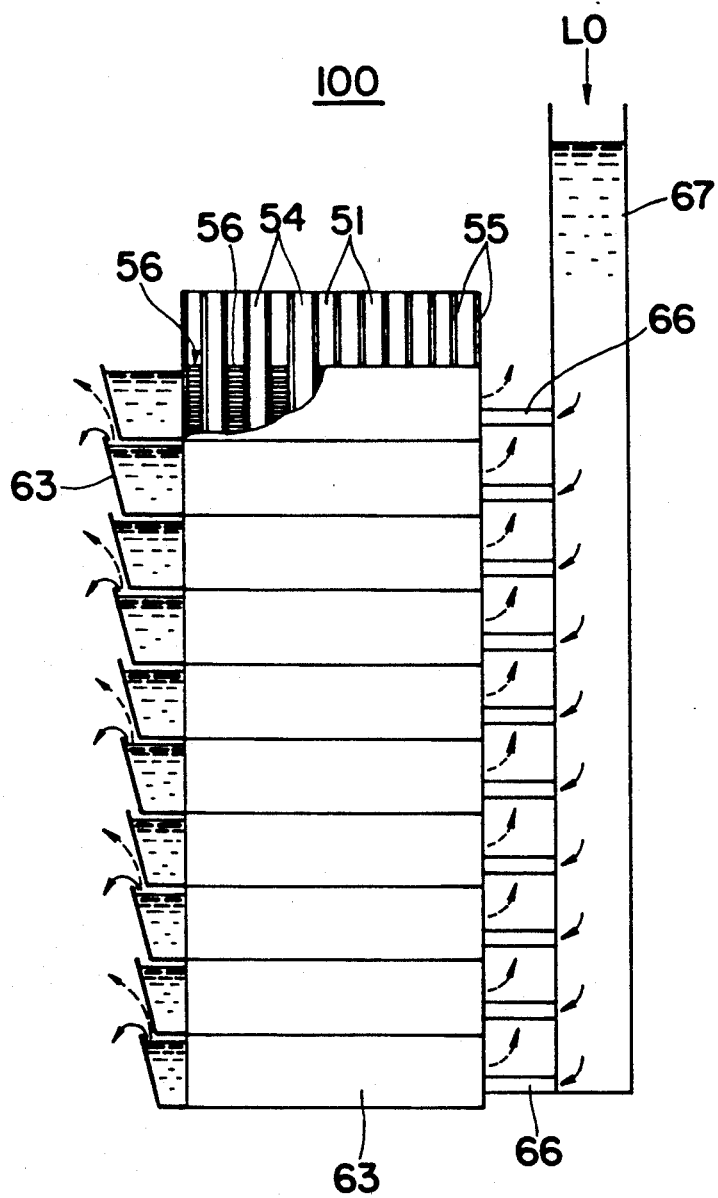

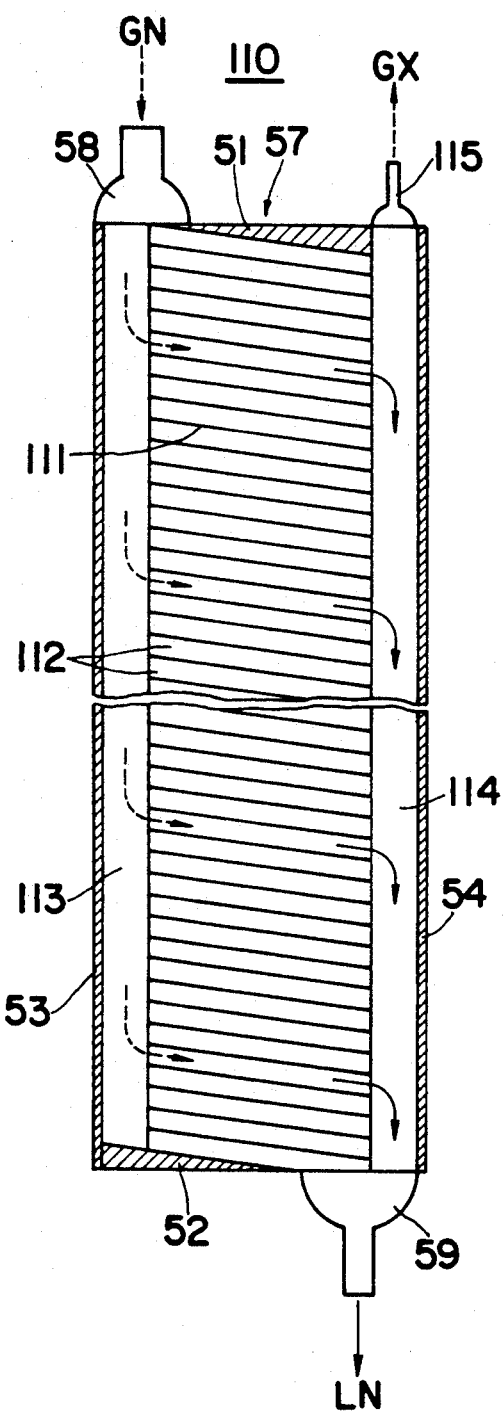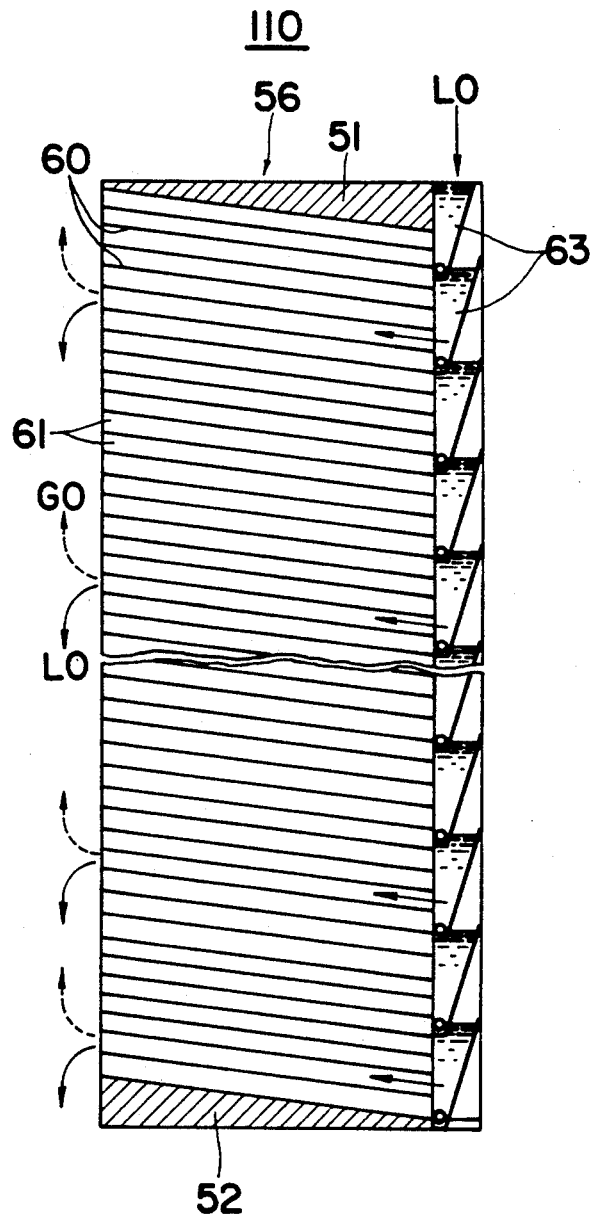

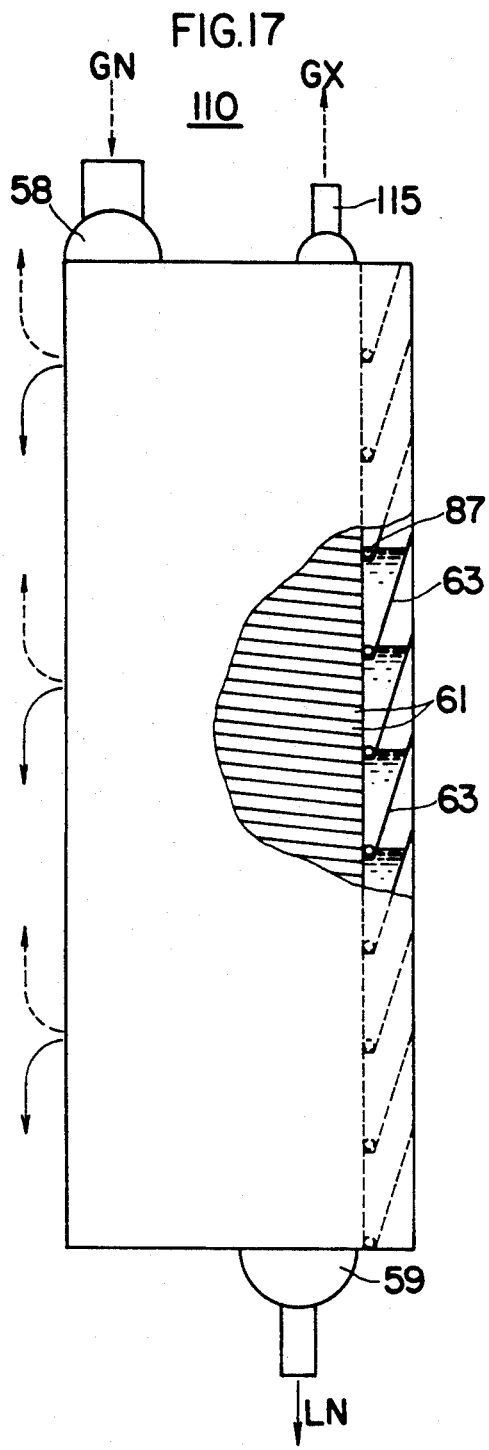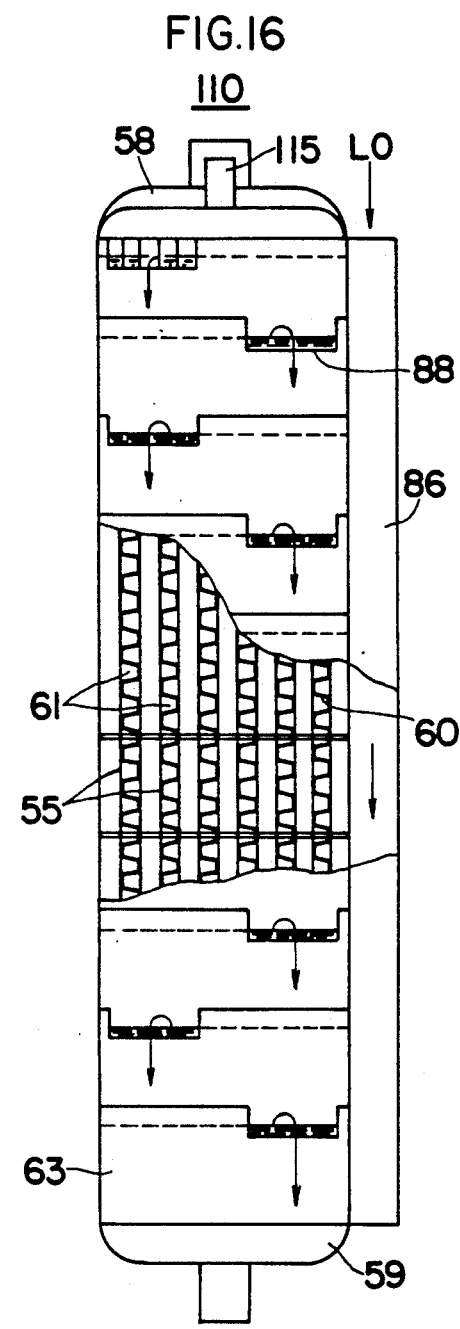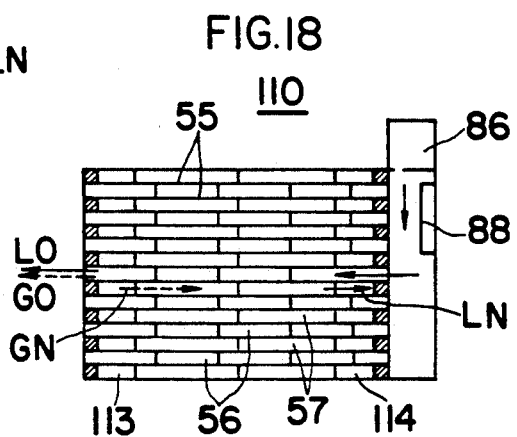

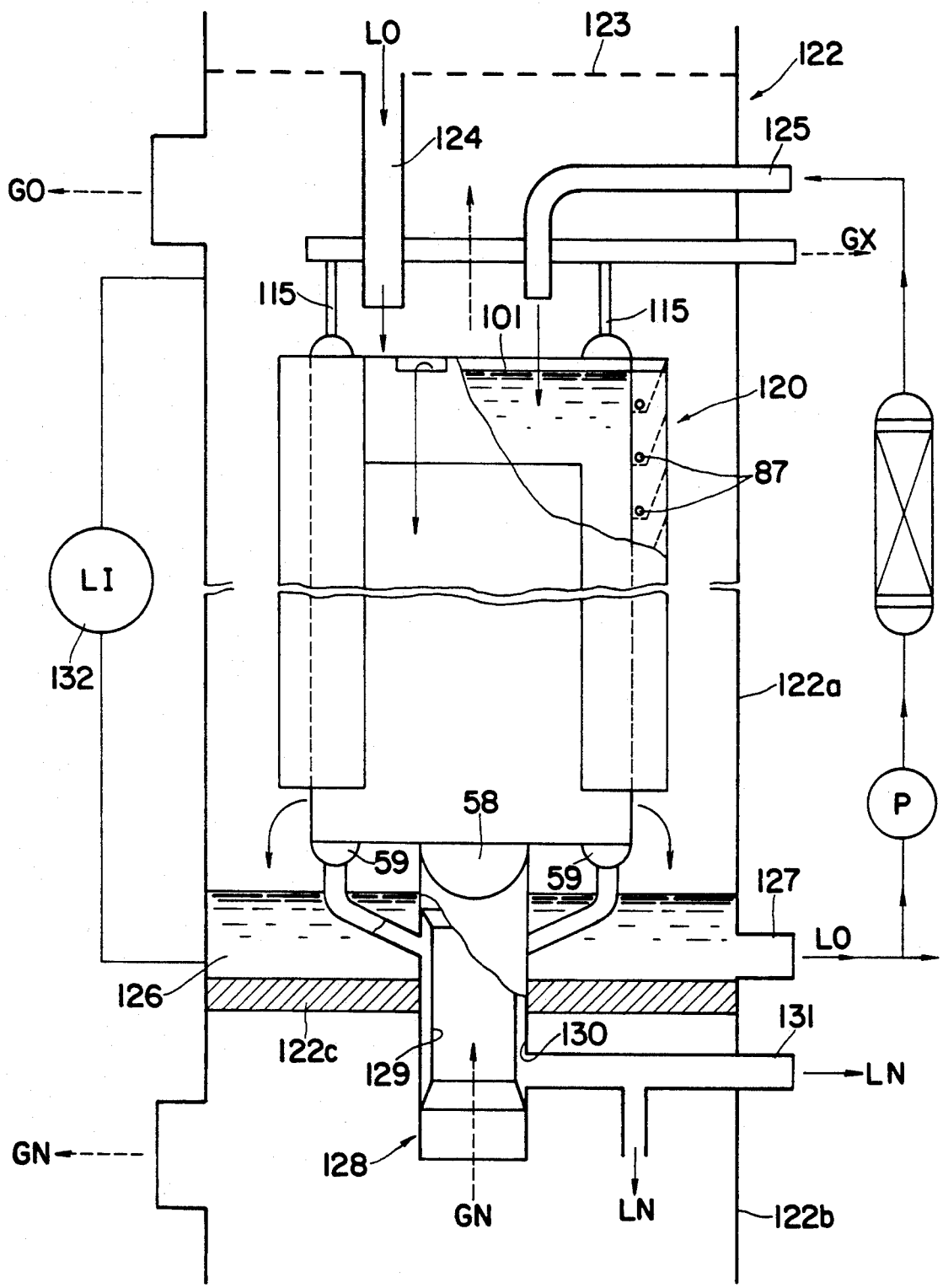

CONDENSER/EVAPORATOR

BACKGROUND OF THE INVENTION

1. Field of the Invention

The present invention relates to a condenser-evaporator which executes heat exchange with a liquid in a first fluid chamber and a fluid in a second fluid chamber to vaporize the liquid in the first fluid chamber.

2. Description of the Related Art a. Conventional Condenser/Evaporator

Many condenser-evaporators for use in double column rectifier of a cryogenic air separation plant, as disclosed in the Published Unexamined Japanese Patent Application No. 56-56592, are so-called plate fin type heat exchangers each employing many parallel partitions vertically separating the condenser-evaporator into two types of chambers, namely oxygen chambers each as the first fluid chamber and nitrogen chambers each as the second fluid chamber, which are alternately provided adjoining one another.

In each oxygen chamber of such a plate fin type condenser-evaporator, many vertical evaporation passages are formed by vertically providing heat exchanger plates, each evaporation passage having top and bottom ends open, with the bottom opening serving as an inlet to introduce, liquid oxygen and the top opening serving as an outlet to flow out a mixture of an oxygen gas and liquid oxygen. As the overall condenser-evaporator is immersed in liquid oxygen retained in the sump bottom space of the low pressure (LP) column of a double column rectifier, each oxygen chamber is filled with liquid oxygen and the liquid oxygen in this oxygen chamber is subjected to heat exchange with nitrogen gas in the adjoining nitrogen chamber, and the part of the liquid oxygen is vaporized into oxygen gas bubbles and rises in the evaporation passage. The liquid oxygen circulates from the inside to outside of a condenser-evaporator because of developed head pressure due to the density difference between the mixture of the vaporized gas and liquid in the oxygen chamber and the liquid around the condenser-evaporator in the sump.

The nitrogens chamber is enclosed chamber in which vertical heat exchanger plates are provided as in the oxygen chamber to form many vertical condensing passages, and it is connected to the high pressure (HP) column of the double column rectifier via headers provided at the upstream and downstream ends of the connecting passages. The nitrogen gas drawn out from the upper portion of the HP column is introduced to the condensing passages through the upper header to be subjected to heat exchange with the liquid oxygen in the adjoining evaporation passage, and the condensed liquid nitrogen is led out from the condenser evaporator through the lower header.

b. Disadvantages of A conventional Condenser-Evaporator

As mentioned above conventional condenser-evaporator is immersed in the sump of liquid oxygen at the bottom space of the LP column, and is well known as a material property that the higher the liquid pressure becomes, the higher the boiling point of the same liquid rises. The head pressure of liquid oxygen in oxygen passage is higher at a lower position than at a higher position of an oxygen passage depending on the depth of liquid oxygen. Therefore, the boiling point of liquid oxygen in the passage is higher at the lower position than at the higher position of the oxygen passage. This phenomenon is generally called the "rise of the boiling point". In liquid oxygen the rise of the boiling point is about 1° C. per one meter of liquid depth. The condenser-evaporator is heat exchanged by the difference between the boiling temperature of oxygen and the condensation temperature of nitrogen according to the following equation of heat transfer.

$$Q = H \times S \times \Delta T$$

where
- Q: Heat exchanged kcal/h
- H: Heat transfer coefficient kcal/m²/C
- S: Heat transfer area m²
- ΔT: Temperature difference C The condensation temperature of nitrogen in the HP column (one example: $-177.5$C. at 4.8 kgf/cm²G) is higher than the boiling point of oxygen in the LP column (one example: $-179.5$C. at 0.6 kgf/cm²G). Therefore the temperature difference between both passages decreases with the rise of the boiling point of liquid oxygen which corresponds to the liquid oxygen head pressure. This means that the head pressure of liquid oxygen reduces the heat amount to be exchanged with the condenser-evaporator.

In order to obtain the required heat exchange, there are two available procedures if heat transfer coefficient H remains constant. The first procedure is to increase heat transfer area S. The secondary one is to increase the temperature difference ΔT.

The first procedure leads us to the disadvantage of a larger shell diameter of the sump.

Normally, the difference between the temperature on the nitrogen side of the conventional condenser-evaporator and that on the oxygen side is designed only 1 to 2° C. at the top of the condenser-evaporator, so that the mentioned rise in boiling point of the liquid oxygen causes a significant problem in the performance of the condenser-evaporator. In other words, making the passage lengths of condenser-evaporator longer in order to get larger heat transfer area results in increasing the height of the condenser-evaporator, or liquid depth of the liquid oxygen and thus raising the boiling point, resulting in a decrease in the temperature difference, so that the heat transfer area should be increased not by increasing the height of condenser-evaporators but by increasing their number. This results in making the diameter of the sump larger to include all condenser-evaporators, which makes it difficult to integrate the LP column, the sump and the HP column.

The second procedure leads us to the disadvantages of higher power consumption. That is, the operational pressure of the HP lower column should be increased to make condensation temperature higher in order to increase the temperature difference.

The operational pressure of the HP column determines the condensation temperature of saturated nitrogen at the top of this column. The higher the operational pressure of the HP column, the higher the outlet pressure of the air compressor becomes.

Since the power of an air separation plant is consumed mostly in the compression of raw air or increasing the pressure of the HP column to develop the temperature difference between nitrogen chamber and oxygen chamber of condenser-evaporator, any further lowering of the pressure of the column can reduce the power consumption. The process flow sheet of this double columned rectification system for air separation is shown in U.S. Pat. No. 4,372,764, Figures and descriptions of line 46-57 in column 2, lines 17-26, and lines 30-33 in column 3.

With the conventional structure in which a condenser-evaporator is immersed in liquid oxygen, however, the reduction in pressure of the HP column should be restricted by an amount of the rise in boiling point of the liquid oxygen by a liquid head.

Further, the heat transfer area of the conventional condenser-evaporator is designed to provide full performance for heat exchange when immersed fully in liquid oxygen. A full immersion of a condenser-evaporator requires that a large amount of liquid oxygen is stored up in the sump, which takes a long time. Before a full immersion, the condensed liquid of the liquid nitrogen serving as a reflux liquid of the HP column and an ascending vapor of the LP column by evaporation of the liquid oxygen are not sufficiently generated. As a consequence, the rectifying operation does not start, requiring an extended wait time (start up time) and resulting in a loss in power consumption. Further, safety measures in case of emergency become a big issue in that a lot of liquid oxygen spills if the sump breaks.

The liquid oxygen rising in the evaporation passage at the bottom portion of the oxygen chamber should be heated by convective heat transfer with a lower heat transfer coefficient up to a boiling onset temperature, which reduces the heat transfer efficiency of that passage. As the nitrogen chamber on the condensing side has condensing passages formed vertically and nitrogen gas flows downward while being condensed, the amount of the liquid nitrogen increases with condensing along the downstream of these condensing passages and the condensed nitrogen becomes a thick liquid film to cover the heat transfer surface of the condensing passages. This film serves as a thermal resistance layer and this reduces the heat transfer performance. Therefore this present invention is related to the condenser-evaporator improved the above-mentioned disadvantages or inconvenient matter of a conventional condenser-evaporator.

SUMMARY OF THE INVENTION

It is an object of the invention to provide a condenser-evaporator with an excellent heat exchanging efficiency.

More particularly, it is an object of this invention to provide a condenser-evaporator which can eliminate the height limitation to the shape to permit an integrated structure of upper and lower columns of a rectifier for use in a large air separation plant, ensure heat exchange without immersing the condenser-evaporator in liquid oxygen, reduce the liquid head pressure by liquid depth to prevent a rise in boiling point, reduce the raw air compressing pressure to reduce the power consumption, and shorten the start up period.

According to this invention, there is provided a condenser-evaporator in which first fluid chambers and second fluid chambers are alternately formed by multiple vertical partitions and a liquid in the first fluid chambers exchanges heat with a fluid in the second fluid chambers. A plurality of heat exchanger plates are arranged in up-and-down multiple stages in the first fluid chambers to form a liquid passage having one end open. A plurality of liquid reservoirs communicating with the liquid passage and having a top open are provided in up-and-down multiple stages on the side of the other end of the liquid passage, and a liquid is introduced in the liquid passage for heat exchange while being supplied to the liquid reservoir in each stage.

BRIEF DESCRIPTION OF THE DRAWINGS

FIGS. 6 through 9 illustrate the fourth embodiment of a condenser-evaporator of this invention, the upper part of FIG. 6 being a cross section taken along the line 6—6 in FIG. 7, the lower part of FIG. 6 being a cross section taken along the line 7—7, FIG. 7 being a cross-sectional plan view of an oxygen chamber, FIG. 8 being a partly cutaway left side view, and FIG. 9 being a partly cutaway right side view;

FIGS. 10 and 11 illustrate the fifth embodiment of this invention, the former being a cross section of an oxygen chamber of an condenser-evaporator, and the latter being a side view of a condenser-evaporator block;

FIGS. 14 through 18 illustrate the sixth embodiment of a condenser-evaporator of this invention, FIG. 14 being a cross-sectional front view of an oxygen chamber of a condenser-evaporator, FIG. 15 being a cross-sectional front view of a nitrogen chamber, FIG. 16 being a partly cutaway side view, FIG. 17 being a partly cutaway front view, and FIG. 18 being a cross-sectional plan view;

FIGS. 19 through 22 illustrate that the condenser-evaporator according to the sixth embodiment is assembled in a double column rectifier, FIG. 19 being a cross-sectional front view illustrating the assembling in the double column rectifier, FIG. 20 being cross-sectional front view illustrating an oxygen chamber, FIG. 21 being a cross-sectional front view illustrating a nitrogen chamber, and FIG. 22 being a cross-sectional plan view illustrating the assembly of the double column rectifier;

DETAILED DESCRIPTION OF THE PREFERRED EMBODIMENT

Figure 1:
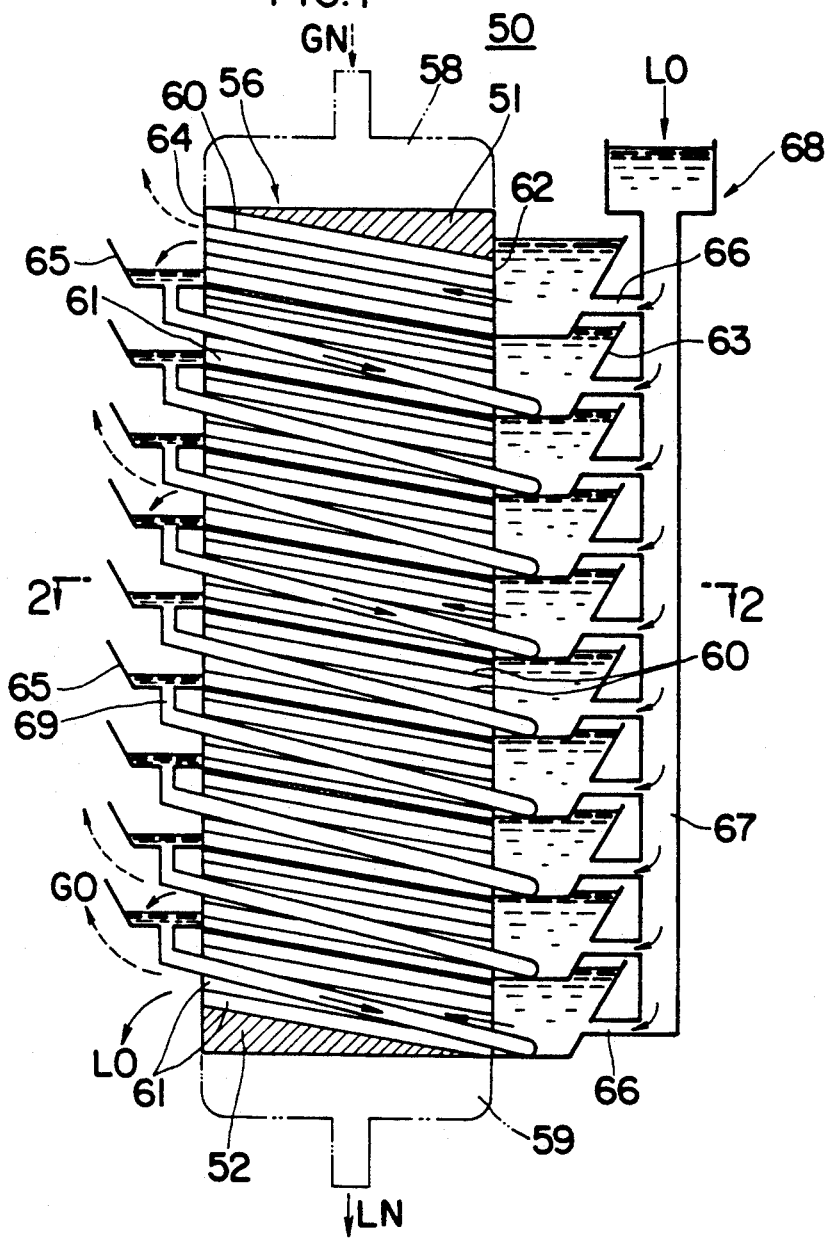
FIGS. 1 and 2 illustrate the first embodiment of this invention, the former being a cross-sectional view of an oxygen chamber of a condenser-evaporator, and the latter a cross-sectional view along the line 2—2 in FIG. 1.

This invention will be described with reference to the accompanying drawings and a case where a liquid to be evaporated is liquid oxygen and fluid to be condensed is nitrogen gas. As the same reference numerals are affixed to identical elements in the individual embodiments of the following description in the drawings, their detailed description will be omitted. The flow of a liquid is indicated by a solid arrow and the flow of gas by a broken arrow.

Figure 2:
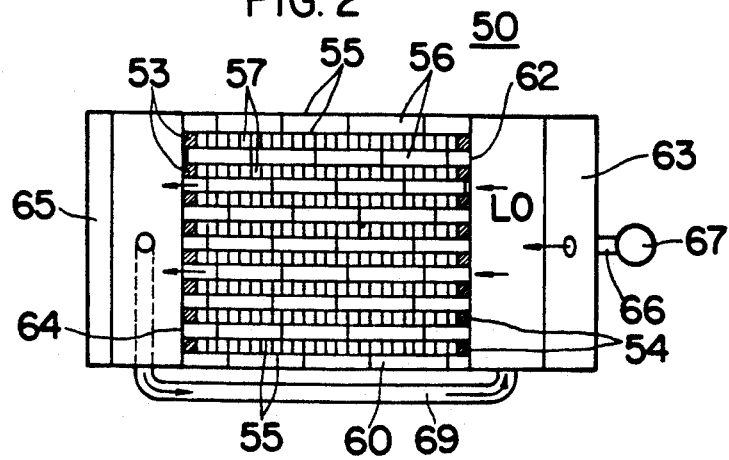

FIGS. 1 and 2 illustrate the first embodiment of this invention, the former showing an oxygen chamber serving as a first fluid chamber and the latter being a cross section along the line 2—2 in FIG. 1.

A condenser-evaporator 50 has multiple oxygen chambers 56 as first fluid chambers and multiple nitrogen chambers 57 as second fluid chambers alternately formed by multiple vertically parallel partitions 55 which are connected by top and bottom slant bars 51 and 52 and left and right side bars 53 and 54. An inlet header 58 for distributively introducing nitrogen, gas GN into the nitrogen chambers 57 is provided at the top of the oxygen chambers 56 and nitrogen chambers 57, and an outlet header 59 for collectively discharging liquid nitrogen LN condensed in the chambers 57 is provided at the bottom of the chambers 56 and 57.

The individual nitrogen chambers 57 are defined by partitions 55 and the side bars 53 and 54 located on the respective sides of the partitions.

The individual oxygen chambers 56 are defined by the partitions 55 and upper and lower slant bars 51 and 52, and heat exchanger plates 60 are provided in up-and-down multiple stages inside each oxygen chamber 56 to form multiple liquid passages 61. Although the heat exchanger plates 60, which divide adjoining partitions 55 in up-and-down, may be used one sheet for each stage, a corrugated heat exchanger fin is normally used therefor. The liquid passages 61 are inclined to have an inclination rising from one end of each oxygen chamber 56 toward the other end. That is, the liquid passages 61 have an upward inclination going from one end of the side of the liquid reservoirs toward a tip of the other end on the open side. A plurality of liquid reservoirs 63 communicating with the liquid passages 61 are provided in up-and-down multiple stages on the side of an inlet 62 which exists at the down parts of the passages 61. Further, a plurality of liquid receivers 65 communicating with the liquid passages 61 are provided in up-and-down multiple stages on the side bf an outlet 64 which exists at the upper parts of the liquid passages 61 in association with the liquid reservoirs 63, except for the last stage liquid passage 61.

The liquid reservoirs 63 are shaped in box having its top open, and communicating with the oxygen chambers 56 in its open side, so that a plurality of up-and-down liquid passages 61 communicate with one liquid reservoir 63. Connected to each liquid reservoir 63 is a liquid distributing means 68 comprising a communication conduit 66 and a manifold 67; liquid oxygen LO is supplied to each liquid reservoir 63 from this liquid distributing means 68. As each liquid reservoir 63 has its top open, pressure is released on the gas side of the associated oxygen chamber 56 and the depth of the liquid in each liquid reservoir 63 is shallow, thus reducing the influence of the liquid head pressure of the liquid oxygen LO. This can prevent the boiling point from rising due to the liquid head pressure at the liquid depth of the liquid oxygen LO, lower the condensation temperature of nitrogen gas GN to reduce the operational pressure of the lower column, and significantly can reduce the power consumption of the raw air compressor.

The liquid receivers 65, almost like the liquid reservoirs 63, are shaped into a box having its top open. The liquid receivers 65 have a side open to the oxygen chambers 56 so that up-and-down multiple liquid passages 61 communicate with one liquid receiver 65. The liquid receivers 65 and the liquid reservoirs 63 are each provided for multiple liquid passages 61 as one block. The liquid receiver 65 communicates with the corresponding liquid reservoirs 63 at a stage lower by one block via a liquid return conduit 69 which connects the bottom portions of both. The liquid oxygen LO, which has flowed through the liquid passage 61 from the liquid reservoir 63 located above and have not been evaporated in that liquid passage 61, returns via this conduit 69 to the liquid reservoir 63 at one lower stage.

The liquid oxygen LO to be introduced into the thus formed oxygen chambers 56 is supplied to the individual liquid reservoirs 63 via the manifold 67. The liquid oxygen LO in each liquid reservoir 63 flows in the associated liquid passage 61 and is subjected to heat exchange with nitrogen gas GN flowing through the adjoining nitrogen chamber 57 via the heat exchanger plates 60 and partitions 55. As a result, part of the liquid oxygen is evaporated to be bubbles of oxygen gas GO. After these bubbles rise in the liquid passage 61 together with the liquid oxygen LO in the passage, they separate from the liquid oxygen LO at the outlet 64 and rise. Meanwhile, the liquid oxygen LO which has not been vaporized in the liquid passage 61, drops from the outlet 64 to be received at the liquid receiver 65 and flows downward to the liquid reservoir 63 located lower by one block via the liquid return conduit 69. The amount of the liquid oxygen LO flowing through the liquid passages 61 is at least six times greater than the amount of evaporation of liquid oxygen to prevent a concentration and precipitation of acetylene.

The liquid oxygen LO flows in the individual liquid passages 61 while sequentially flowing down via the liquid return conduits 69 for the lower liquid reservoirs 63 from the liquid receivers 65, and flows downward repeating the evaporation and down flow. The liquid oxygen LO which have not yet been evaporated in the lowermost liquid passage 61 flows downstream of the condenser-evaporator 50 from the outlet 64 and remains in the liquid reservoir at the bottom portion of the upper column of the double column rectifier. Part of the liquid oxygen LO is extracted as a product as needed, the remaining portion is moved up by a liquid oxygen pump or thermosiphon reboiler or the like, and is again supplied, circulating, to each liquid reservoir 63 from the liquid distributing means 68 after concentrated acetylene is removed through an acetylene absorber. The circulating liquid oxygen LO is part of excess liquid oxygen LO that is supplied to the oxygen chambers 56 to prevent precipitation of a hydrocarbon such as acetylene into each passage. Since the amount of this liquid oxygen is only that of the liquid oxygen LO flowing down from the lower most liquid passage 61 of the oxygen chamber 56, as mentioned above, the above circulating amount needs to be very small.

The angle of inclination of each liquid passage 61 is properly selected according to the depth of the liquid reservoir 63 to be connected and the length of that liquid passage 61. Although the liquid passage 61 may be horizontally provided, inclining the liquid passage 61 facilitates the flowing out of the bubbles of the oxygen gas GO originating from evaporation the heat transfer rate by progressing, enhancing the flow of the liquid oxygen LO. The vertical pitch of the individual liquid passages 61 is set properly so that the oxygen gas GO is accompanies the liquid oxygen LO. If this pitch is too large, it is difficult for the floating force of the oxygen gas GO to encourage a likewise flow of the liquid oxygen LO.

As in the above embodiment, forming the liquid passages 61 with an inclination permits the floating force of the bubbles of the evaporated oxygen gas GO to encourage a likewise movement of the liquid oxygen LO and discharge the gas from the outlet 64. Accordingly, the liquid oxygen LO is effectively evaporated, and the evaporated oxygen gas GO does not remain, so that the heat exchanging efficiency of the condenser-evaporator 50 can be improved. The amount of the liquid oxygen LO flowing in each liquid passage 61 can be controlled by controlling the liquid depth in the liquid reservoirs 63, or by controlling the length, inclination or opening cross-section area of the liquid passage 61.

The liquid return conduits 69 may be formed in a gutter shape with an open top, and a plurality of them may be provided depending on the amount of the liquid. Further, by providing a nitrogen chamber on either outside of the condenser-evaporator 50, and providing a gutter-shaped liquid return conduit in close contact with the outside wall of the nitrogen chamber, the nitrogen gas can be heat-exchanged with the liquid oxygen at this portion to evaporate the latter.

The liquid distributing means 68 may be provided with an overflow conduit or weir with the proper height to each liquid reservoir 63 so as to cause the liquid oxygen LO to sequentially flow in the liquid reservoirs 63 at lower stages from the overflow conduit or weir, instead of providing the manifold 67 and the communicating conduits 66. Alternately, the manifold 67 and the liquid reservoirs 63 may be integrally formed with a communicating hole having a predetermined diameter to provide communication between the manifold 67 and each liquid reservoir 63, so that the liquid oxygen LO can be supplied to each liquid reservoir from the communicating hole. Further, a predetermined amount of liquid oxygen LO may be supplied to each liquid reservoir 63 by providing a flow regulating mechanism at the upper portion of the manifold 67, or adjusting the diameter or location of the communicating conduit 66, the communicating hole or the overflow conduit, and further adjusting the height of the overflow conduit or weir.

As described above, the liquid oxygen LO which has not been evaporated in the liquid passage 61 is received in the liquid receiver 65 provided at the outlet 64 of this liquid passage without flowing downward in the condenser-evaporator 50 as it is from the outlet 64, and it is then returned to the liquid reservoir 63 at the inlet 62 from the liquid receiver 65, thus significantly reducing the amount of liquid oxygen flowing downward. That is, to prevent precipitation of acetylene, more excessive liquid oxygen LO than has been evaporated should be supplied to the liquid reservoir 63 or liquid receiver 65 at that stage and be permitted to flow downward. Accordingly, it is possible to make compact the raising means more compact in using either a liquid oxygen pump or thermosiphon reboiler to move the liquid oxygen LO above the condenser-evaporator 50 from the bottom of the upper column of the rectifier, which can considerably reduce the operational power cost by lowering the compressing pressure of the raw air compressor as well as reduce the cost of the equipment and operational power requirement of the ascending means.

Figure 3:
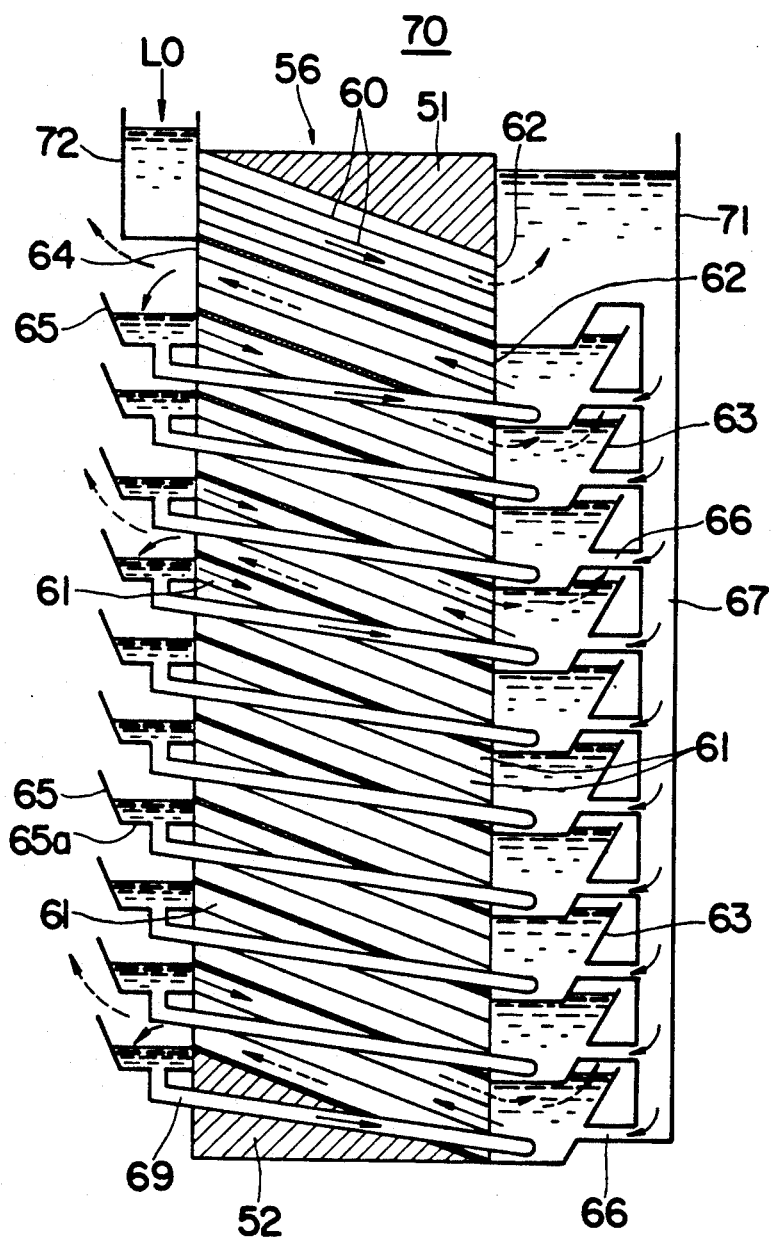
FIG. 3 is a cross-sectional view of an oxygen chamber of a condenser-evaporator according to the second embodiment.

FIG. 3 illustrates a second embodiment of this invention.

An oxygen chamber 56 of this condenser-evaporator 70, as in the above embodiment, has a plurality of liquid passages 61 formed in up-and-down multiple stages, liquid reservoirs 63 and liquid receivers 65 are provided in multiple stages at two ends of each liquid passage 61. Further, a liquid reservoir 71 and a liquid receiver 72 for supplying liquid oxygen LO are provided in the block of the liquid passage 61 at the uppermost stage. The liquid receiver 65 at each stage below the liquid receiver 72 has its bottom 65a communicating with the liquid passage 61, which communicates with the top portion of the liquid reservoir 63 lower than that liquid reservoir 63 which introduces into the liquid passage 61 the liquid oxygen LO flowing downward to that liquid receiver 65. Further, a liquid return conduit 69 connects the liquid receiver 65 with the liquid reservoir 63 together which correspond to the block of each liquid passage 61.

Accordingly, liquid oxygen LO flowing downward from the rectifier section of the upper column of the double column rectifier or the liquid oxygen LO supplied from the bottom of the upper column in circulation by the liquid oxygen pump or thermosiphon reboiler, etc. is first supplied to the uppermost liquid receiver 72, then it flows down the block of the uppermost liquid passage 61 to the uppermost liquid reservoir 71. Meanwhile, the oxygen gas GO which has been evaporated while flowing down through the liquid passage 61 rises against the liquid flow along that liquid passage 61 from the liquid receiver 72, or flows down together with the liquid to the liquid reservoir 71 and then separated, rising from this liquid reservoir 71. The liquid oxygen LO in the uppermost liquid reservoir 71 flows down to the lower liquid reservoirs 63 via the manifold 67 and communicating conduit 66, and enters the respective liquid passages 61.

The liquid oxygen LO which has not been evaporated in the liquid passages 61 is received in each liquid receiver 65 at the outlet 64, and part of the liquid oxygen flows into the liquid passage 61 communicating with the top of the lower liquid reservoir 63 from that liquid receiver 65 and flows downward, due to the inclination of this passage 61 to enter the lower liquid reservoir 63. The oxygen gas GO, which has been evaporated during the downward flow, flows down together with the liquid oxygen LO to the liquid reservoir 63 and is separated to rise therefrom. A part of the liquid oxygen LO received at the liquid receiver 65 flows into the liquid passage 61 to be introduced to the lower liquid reservoir 63 and the rest is returned to the original liquid reservoir 63 via the liquid return conduit 69 for circulation.

The liquid oxygen LO between the liquid reservoir 63 and liquid receiver 65 corresponding to the block of the lowermost liquid passage 61 circulates in a path going from the liquid reservoir 63 and returning thereto through the liquid passage 61, liquid receiver 65 and liquid return conduit 69 while part of it is being evaporated. The liquid oxygen LO excessively supplied to prevent precipitation of acetylene overflows from this lowermost stage liquid reservoir 63 or liquid receiver 65 and flows to the bottom of the upper column.

By introducing part of the liquid oxygen LO, returning to the liquid reservoir 63 from the liquid receiver 65, into the liquid passage 61 that communicates with the top of the lower liquid reservoir 63, it is possible to prevent acetylene precipitation without using an excess amount of excess liquid oxygen, as compared to the first embodiment.

In other words, if the liquid receiver 65 is not provided, the liquid oxygen LO will flow into each liquid passage 61 communicating with the liquid reservoir 63 depending on the liquid level in the liquid reservoir 63, so that only a slight amount of liquid oxygen LO flows in the liquid passage 61 communicating with the upper part of the liquid reservoir 63. This may cause the bubbles of oxygen gas GO to flow backward, without rising together with the liquid through the liquid passage 61 toward the outlet 64. When this counter flow phenomenon occurs, the liquid oxygen LO may not reach the outlet 64 of the liquid passage 61, thus forming a dry region in the passage and acetylene may be precipitated there. At this time, by making the bottom of the liquid receiver 65 communicate with the liquid passage 61 at the top of the lower stage liquid reservoir 63, liquid oxygen LO can be introduced in the liquid passage 61, to prevent drying of the interior of the liquid passage 61, i.e., precipitation of acetylene. Further, with this structure, this liquid passage 61 serves the same function as that of the liquid return conduit 69 to sequentially supply the liquid oxygen LO to lower stages, thus eliminating the need to separately provide the liquid return conduit 69. The number of liquid passages used for returning a liquid can properly be set according to the amount of processing or the like.

Figure 4:
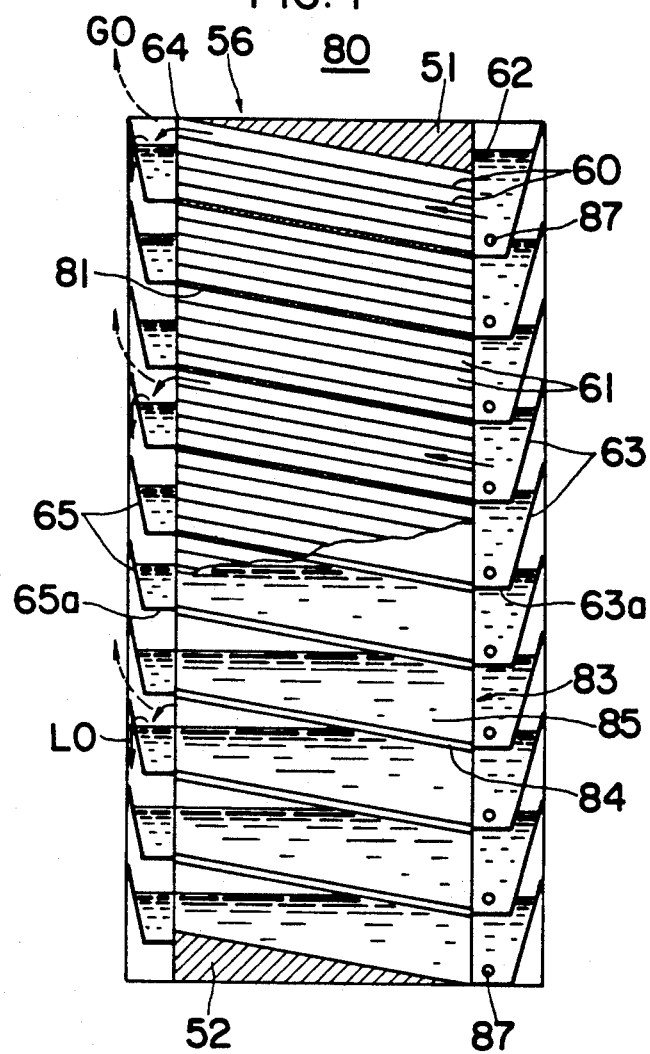
FIGS. 4 and 5 illustrate the third embodiment, the former being a longitudinal cross-sectional view illustrating an oxygen chamber and a liquid return chamber of a condenser-evaporator and the latter being a lateral cross-sectional view of the condenser-evaporator.
Figure 5:
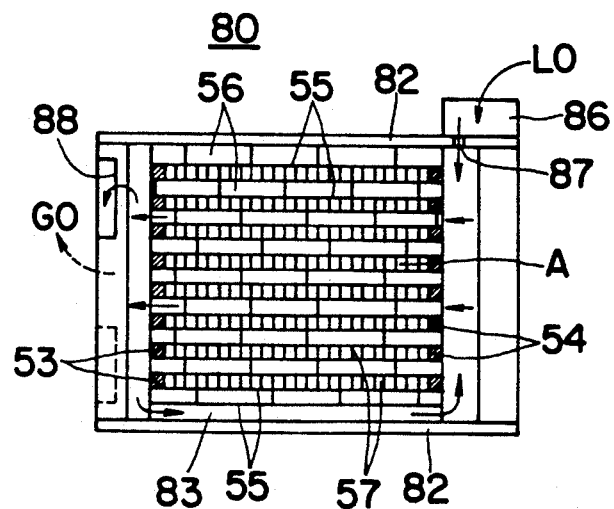

FIGS. 4 and 5 illustrate a third embodiment in which a liquid return chamber serving as a liquid return passage is formed adjacent to an oxygen chamber.

The oxygen chamber 56 of this condenser-evaporator 80, as in both of the above embodiments, has heat exchanger plates 60 provided in multiple stages to form a plurality of liquid passages 61 in a chamber defined by partitions 55 and slant bars 51 and 52, with liquid reservoirs 63 having their open tops on the side of an inlet and liquid receivers 65 having their open tops on the side an outlet 64 being provided in multiple stages at both ends of each liquid passage 61. At the heat exchanger plate portion where a bottom plate 63a of the liquid reservoir 63 and a bottom plate 65a of the liquid receiver 65 are connected, a plate thicker than the ordinary heat exchanger plate or a partition rod 81 is located to improve the connectability between both bottom plates 63a and 65a and reduce liquid leaks from the connected section.

A side plate 82 is further provided outside the outermost oxygen chamber 56, and a liquid return chamber 83 is formed between the side plate 82 and the partitions 55 which define the oxygen chamber 56. As shown in the lower half of FIG. 4, this liquid return chamber 83 has a plurality of partition rods 84 provided which connect the bottom plate 63a of the liquid reservoir 63 and the bottom plate 65a of the liquid receiver 65 in association with each block. The upper and lower partition rods 84 and the side plate 82 and the partitions 55 define liquid return passages 85 corresponding to the liquid reservoir 63 and liquid receiver 65.

The above-described constitute liquid return passage 85, like the liquid return conduit 69 of the previous embodiment, serves to permit the liquid oxygen LO to flow toward the liquid reservoir 63 from the liquid receiver 65, and should preferably not be provided adjoining the nitrogen chamber 57 in order to prevent the liquid oxygen LO to be evaporated in the liquid return passage 85 to hinder the flow of the liquid, due to the aforementioned problem of precipitation of a hydrocarbon, particularly in the case of the liquid oxygen LO.

Therefore, it is preferable that the liquid return chamber 83 be formed outward of the oxygen chamber 56 at the outermost location or between the oxygen chambers 56. For example, if the nitrogen chamber 57 at the position indicated by "A" in FIG. 5 serves as the liquid return chamber, the oxygen chambers 56 are preferably located at both sides of the liquid return chamber. The liquid return chamber 83 may be provided adjacent to the nitrogen chamber 57. In this case, the width of the passage should depend upon the flow resistance produced by the bubbles of evaporated oxygen gas GO.

Although it is preferable to reduce the flow resistance in the liquid return conduit 85 as much as possible, a corrugation fin or spacer which has a lower flow resistance may be provided in order to improve the structural strength.

A plurality of liquid return chambers 83 may be provided in accordance with the flow rate of the liquid oxygen LO, for example, at both sides and at the center, and may be combined with the aforementioned liquid return conduits or the like.

According to this embodiment, both ends of the side plates 82 located at both sides of the condenser-evaporator 80 extend to constitute both side walls of the liquid reservoir 63 and liquid receiver 65, and on the side of the liquid reservoir 63 of one side plate 82, a liquid supply conduit 86 as the liquid distributing means is disposed adjacent and a communicating hole 87 corresponding to each liquid reservoir 63 is bored there. The liquid supply conduit 86 and the communicating hole 87 may be provided on the side of the liquid receiver 65 to supply liquid oxygen LO to each liquid receiver 65. A weir 88 is cut in the side wall of the end portion of the liquid receiver 65, so as to permit a given amount of liquid oxygen LO to flow downward to prevent precipitation of a hydrocarbon such as acetylene as well as to control the amount of liquid in each block constant.

As described above, the individual fluid chambers 56 and 57 or the liquid return passage 85 and the liquid reservoir 63 or the liquid receiver 65 can easily and integrally be produced by, for example, aluminum brazing, which prevents conduits, gutters or the like from being exposed. It is therefore easy to handle.

Figure 6:
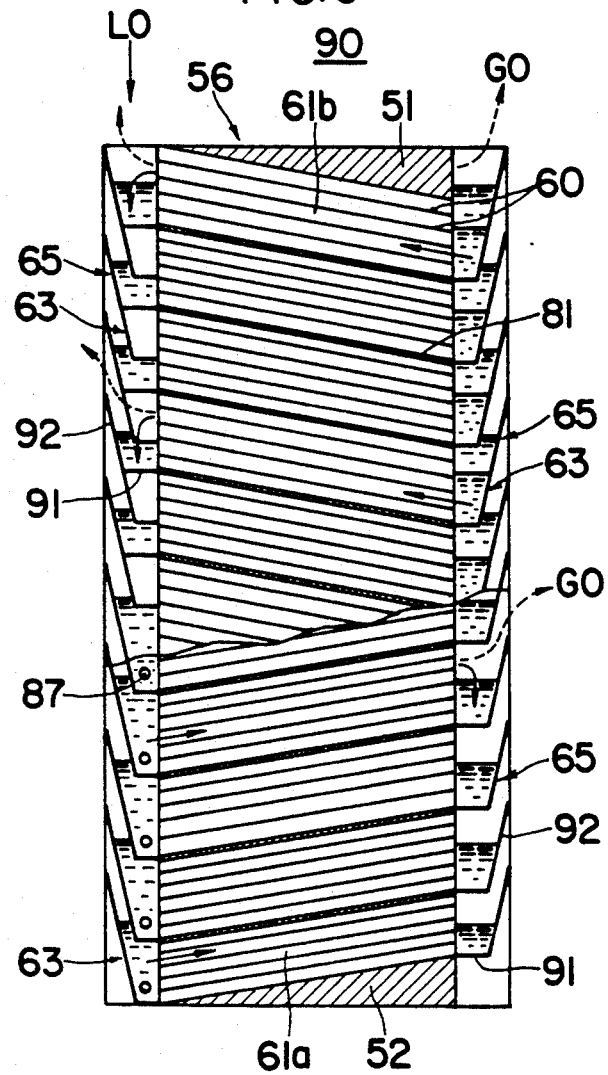
Figure 7:
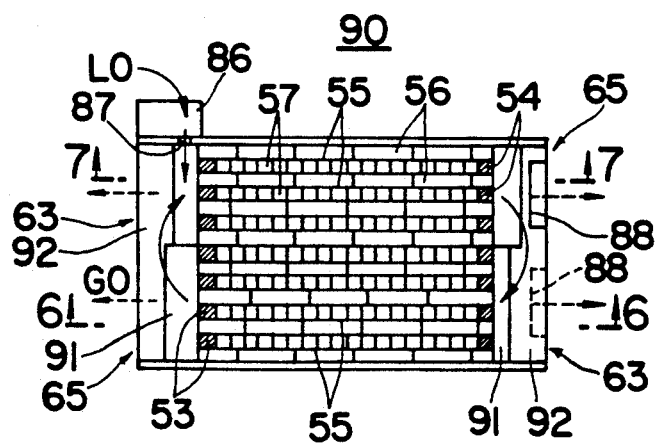

A condenser-evaporator 90 as shown in FIGS. 6 to 9 has an oxygen chamber 56 in which a first liquid passage 61a inclining upward from one side of the condenser-evaporator to the other side and a second liquid passage 61b inclining in the opposite direction to the first liquid passage 61a, upward from the other side of the condenser-evaporator to said one side, are formed. The first liquid passages 61a rising rightward in FIG. 6 are collectively located at one side (upper half in FIG. 7) of the condenser-evaporator 90 in the width direction (upward direction in FIG. 7), and the second liquid passages 61b rising leftward in FIG. 6 are collectively located at the other side (lower half in FIG. 7). These liquid passages 61a and 61b are normally formed by inclining a corrugated heat exchanger fin. Partition rods 81 slightly thicker than the heat exchanger plate are placed at the proper intervals of the liquid passages 61a and 61b to define passage blocks.

A plurality of liquid reservoirs 63 and liquid receivers 65 communicating with the liquid passages 61a and 61b are provided in up-and-down multiple stages at the end portion of oxygen chamber 56. The liquid reservoirs 63 and liquid receivers 65 are provided for a plurality of liquid passages 61a and 61b in the vertical direction as one passage block, and are formed by a single bottom plate 91 bent to be disposed at a given location and a wall plate 92 provided to enclose the three sides of the bottom plate 91. The liquid reservoirs 63 and liquid receivers 65 communicate with each other at the upper surface of the bottom plate 91, with an attaching level of the plate 91 which corresponds to the liquid receiver 65 being set higher than that level corresponding to the liquid reservoir 63, in order to permit the liquid oxygen LO flowing in the liquid receiver 65 to flow down to the liquid reservoir 63 at the same stage.

The liquid oxygen LO to be introduced to the oxygen chamber 56 is supplied through the communicating hole 87 to the liquid reservoir 63 on the side of the first liquid passage 61a from the liquid supply conduit 86, and flows in this passage 61a to be subjected to heat exchange with nitrogen gas GN in the adjoining nitrogen chamber 57, so that part of the liquid oxygen is evaporated as oxygen gas GO. The liquid oxygen LO which has not been evaporated flows out, accompanied with the oxygen gas GO, from the outlet of the first liquid passage 61a, and flows into the liquid receiver 65 at the end portion of this passage 61a. The liquid oxygen in the liquid receiver 65 flows over the bottom plate 91 and down to the liquid reservoir 63 of the adjoining second liquid passage 61b, and is then introduced in this passage 61b from the liquid reservoir 63. At this time, part of the liquid oxygen LO overflows the weir 88 down to the liquid reservoir 63 or liquid receiver 65 at a lower stage or to the lower portion of the condenser-evaporator 90.

In other words, the liquid oxygen LO supplied to the liquid reservoir 63 from the liquid supply conduit 86 is introduced to the first liquid passage 61a from the liquid reservoir 63, reaches the liquid receiver 65 while partly evaporated, flows down from the liquid receiver 65 to the liquid reservoir 63 of the second liquid passage 61b to be introduced into the passage 61b, then returns to the original liquid reservoir 63 from the liquid receiver 65 of the second liquid passage 61b, and circulates in this path. Accordingly, that amount of liquid oxygen LO which equals the amount evaporated in individual passages 61a and 61b and the amount overflowing from the weir 88, is supplemented to the liquid reservoir 63 from the liquid supply conduit 86.

As the liquid oxygen LO circulates the liquid passages 61a and 61b at the same stage through the liquid receiver 65 and liquid reservoir 63 while being partly evaporated in the passages 61a and 61b, it is possible to significantly reduce the amount of liquid oxygen flowing downward of the-condenser-evaporator 90.

Although, according to this embodiment, the individual upper and lower liquid reservoirs 63 and liquid receivers 65 are of the same size and adjacent liquid reservoir 63 and liquid receiver 65 communicate with each other over the bottom plate 91, the sizes of the liquid reservoirs 63 and liquid receivers 65 may be changed along an up-and-down direction, or the liquid reservoirs 63 and liquid receivers 65 may be shaped into independent boxes, both being connected by gutters or conduits which serve as communicating passages for liquid supply.

FIGS. 10 and 11 illustrate a fifth embodiment in which multiple condenser-evaporator blocks are integrally arranged to constitute a condenser-evaporator.

A plurality of liquid reservoirs 63 are provided in up-and-down multiple stages between the individual condenser-evaporator blocks 100a, 100b, 100c and 100d of this condenser-evaporator 100. In FIG. 10, this liquid reservoir 63 serves as a liquid supplying liquid reservoir for the condenser-evaporator block located on the left side of the liquid reservoir 63, and serves as a liquid receiver for the condenser-evaporator block located on its right side as well as serving as a liquid supply passage. To each liquid reservoir 63 is connected a manifold 67 through a communicating conduit 66, so that liquid oxygen LO retained in a liquid oxygen receiver 101 provided at the upper portion of the condenser-evaporator 100 is supplied to each liquid reservoir 63 communicating with conduit 66.

The liquid oxygen LO to be introduced to oxygen chamber 56 is supplied to each liquid reservoir 63 from the manifold 67 and flows into each liquid passage 61. The liquid oxygen LO which has not been evaporated in the liquid passage 61 flows out from the associated outlet 64, accompanied by the oxygen gas GO, and flows down to the liquid reservoirs 63 provided between the adjoining condenser-evaporator blocks 100a, 100b, 100c and 100d at the next stage. Most of the liquid oxygen LO which flows down to the liquid reservoirs 63 flows together with the liquid oxygen LO supplied from the manifold 67 into the liquid passages 61 of the condenser-evaporator blocks 100a, 100b, 100c and 100d at the next stage, though part of it overflows downward of the condenser-evaporator 100.

As described above, while being partly evaporated in the liquid passages 61 of the individual condenser-evaporator blocks 100a, 100b, 100c and 100d, the liquid oxygen LO flows into the individual liquid passages 61 of the condenser-evaporator block at the next stage. If the condenser-evaporator blocks 100a, 100b, 100c and 100d are linearly arranged, the liquid oxygen LO going out from the liquid passages 61 of the condenser-evaporator blocks 100a, 100b, 100c and 100d at the last stage can be returned and recycled to the condenser-evaporator blocks 100a, 100b, 100c and 100d of the first stage by providing gutters or conduits between the liquid receivers provided at the outlets 64 of the individual liquid passages 61 of the last stage condenser-evaporator blocks 100a, 100b, 100c and 100d and the liquid reservoirs of the first stage condenser-evaporator blocks 100a, 100b, 100c and 100d.

Accordingly, as described above, excess liquid oxygen LO supplied to each liquid passage 61 and flowing out from the passage is sequentially supplied to the adjoining liquid passages 61 of the condenser-evaporator blocks 100a, 100b, 100c and 100d at the same stage, thus significantly reducing the amount of liquid oxygen flowing downward of the condenser-evaporator 100.

By dividing the condenser-evaporator 100 into a plurality of condenser-evaporator blocks 100a, 100b, 100c and 100d to shorten each liquid passage 61, evaporated oxygen gas GO and liquid oxygen LO can be efficiently separated, thus improving heat exchanging efficiency.

Although, according to this embodiment, the liquid reservoirs 63 of the individual condenser-evaporator blocks 100a, 100b, 100c and 100d have the same level and the same size and a liquid is sequentially supplied to the condenser-evaporator blocks 100a, 100b, 100c and 100d at the next stage, the vertical levels or sizes of the individual liquid reservoirs 63 may be changed. More specifically, as shown in FIG. 11, if the weirs of the upper liquid reservoirs 63 overhang the lower liquid reservoirs 63 to cause the overflowed liquid oxygen LO from the weir to flow down directly to the bottom of the upper column, concentration of acetylene can be decreased. Further, liquid reservoirs and liquid receivers may be provided at both sides of each of the condenser-evaporator blocks 100a, 100b, 100c and 100d, and may be connected together by gutters or conduits serving as liquid supply passages.

Figure 12:
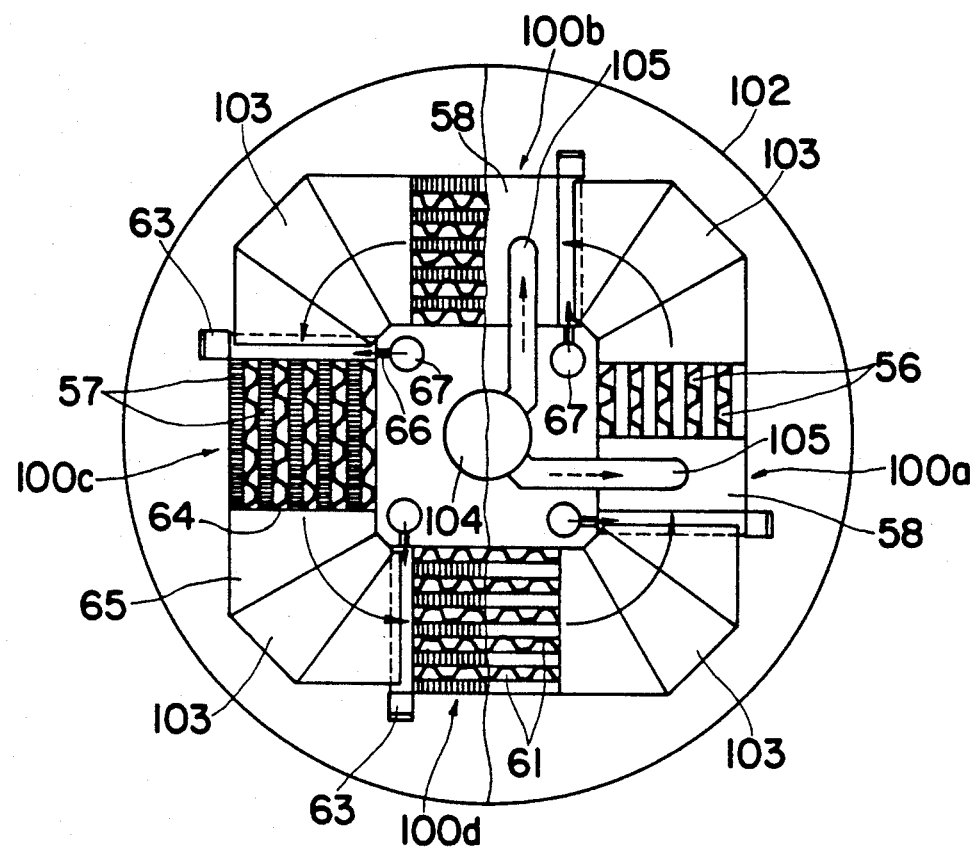
FIGS. 12 and 13 illustrate one example in which the condenser-evaporator of the fifth embodiment is assembled in a rectifier, the former being a cross-sectional plan view and the latter being a perspective view of the essential section.
Figure 13:
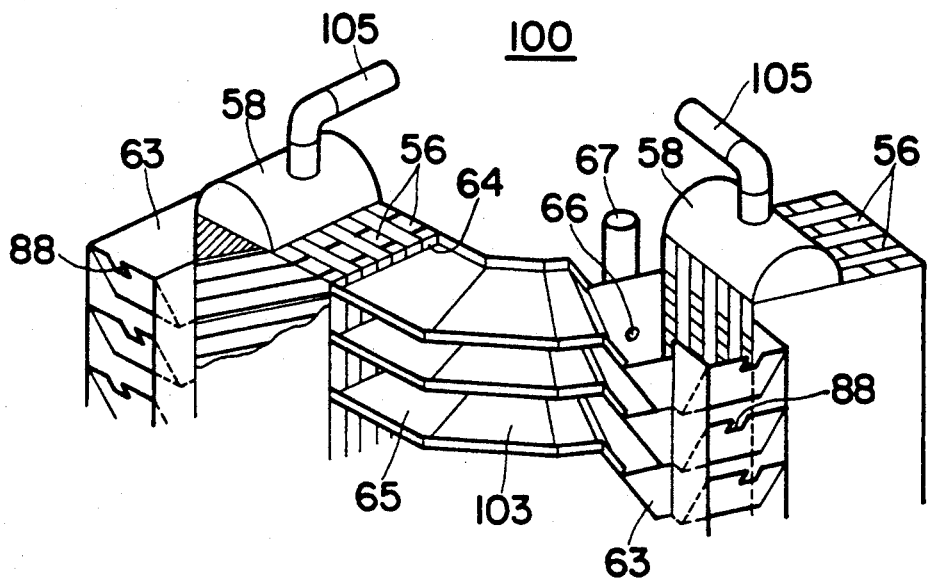

FIGS. 12 and 13 illustrate one example in which the condenser-evaporator 100 with the above structure is assembled into a cylindrical vessel, for example, a rectifier bottom.

In this condenser-evaporator 100, four condenser-evaporator blocks 100a, 100b, 100c and 100d, as described in the fifth embodiment, are arranged on the same circumference in an upper column 102 of the rectifier, and are connected by wide gutters 103 serving, as liquid supply passages. The liquid oxygen LO which flows out from the outlet 64 of the liquid passage 61 of each of the condenser-evaporator blocks 100a, 100b, 100c and 100d is received at the liquid receiver 65, then is guided by the gutter 103 to the liquid reservoir 63 of each of the condenser-evaporator blocks 100a, 100b, 100c and 100d at the next stage. A weir 88 is cut in the side wall of the liquid reservoir 63, so that excess liquid oxygen LO supplied to the liquid reservoir flows down to the liquid reservoir 63 at the next stage from this weir 88. Therefore, the liquid oxygen LO supplied through a communicating conduit 66 from a manifold 67 flows counterclockwise in FIG. 12 while being partly evaporated in the condenser-evaporator blocks 100a, 100b, 100c and 100d, and partly flows as liquid oxygen for preventing precipitation of a hydrocarbon sequentially downward of the condenser-evaporator 100 via lower liquid reservoirs 63.

The nitrogen gas GN for heat exchange with the liquid oxygen LO is introduced to the nitrogen chamber 57 from a nitrogen gas elevating conduit 104 and distributing conduit 105 provided at the center portion of the upper column 102 through an inlet header 58 provided at the top of each of the condenser-evaporator blocks 100a, 100b, 100c and 100d, and is condensed and led out from an outlet header (not shown).

Arranging the condenser-evaporator blocks 100a, 100b, 100c and 100d on the same circumference facilitates circulation of liquid oxygen LO. Further, since the condenser-evaporator blocks 100a, 100b, 100c and 100d having the same structure can be arranged, assembly is easier.

FIGS. 14 through 18 illustrate the sixth embodiment of this invention. This condenser-evaporator 110 is preferably constructed such that heat exchanger plates 60 are arranged up-and-down in multiple stages as described earlier to form liquid passages 61. A nitrogen chamber 57 is formed through partitions 55 adjacent to an oxygen chamber 56 designed to introduce liquid oxygen LO to the passages 61 from liquid reservoirs 63 located at one side thereof. Each nitrogen chamber 57 is closed all around by slant bars 51 and 52 and side bars 53 and 54, and has heat exchanger plates 111 such as corrugation fins disposed therein to define many condensing passages 112 as gas passages open at both ends, with a gas guide passage 113 and discharge passage 114 being provided at respective sides of the condensing passages 112.

In order to lead out liquid nitrogen LN condensed in the condensing passage 112, the passage 112 has a proper downward inclination with respect to the horizontal direction extending from the gas guide passage 113 to the discharge passage 114. An inlet header 58 and an outlet header 59 are coupled respectively to the gas guide passage 113 and discharge passage 114 at both sides of the nitrogen chamber 57 to introduce nitrogen gas GN into the chamber 57 and discharge liquid nitrogen LN condensed in the condensing passage 112.

The nitrogen gas GN is introduced to the individual condensing passages 112 through the inlet header 58 and gas guide passage 113. The nitrogen gas GN led to the condensing passages 112 is heat-exchanged with liquid oxygen LO in the adjoining oxygen chamber 56 and is condensed to be liquid nitrogen LN. This liquid nitrogen LN then flows down toward the discharge passage 114 due to the downward inclination of the condensing passages 112, and is discharged through the outlet header 59 from the discharge passage 114. Non-condensed gas GX in the nitrogen gas GN is discharged from a purge nozzle 115 provided at the top of the discharge passage 114.

Since many condensing passages 112 inclined downward are formed in the nitrogen chamber 57 to lead nitrogen gas GN from one end of each condensing passage 112 and discharge it from the other end, the amounts of nitrogen gas introduced into each condensing passage 112 arranged in the up-and-down direction in the nitrogen chamber 57 can be made the same and the amounts of nitrogen condensed in the passages 112 can be made substantially the same from the uppermost to the lowermost condensing passage 112. The film heat transfer coefficients in the vertical direction of the condenser-evaporator 110 can therefore be made substantially the same anywhere.

Accordingly, sufficient heat exchange with the liquid oxygen LO at the lower portion of the oxygen chamber 56 is possible, thus providing the maximum heat exchanging performance by condensation/evaporation. Particularly, in a large and tall condenser-evaporator, the condensing passage 112 can be shortened significantly as compared with the prior art, and the liquid film of liquid nitrogen LN formed in each condensing passage 112 close to the discharge passage 114 can be made thinner, thus minimizing a reduction in heat exchanging performance. In addition, since the cross section and the opening area of the condensing passage 112 can be increased, the amount of condensation and fluid resistance per area of the condensing passage decreases, thereby further improving the heat exchanging efficiency. Also, if a liquid dropper which is a protruding portion of the heat exchanger plate 111 is provided at part of the open end of the condensing passage 112 open to the discharge passage 114, the liquid nitrogen LN flowing down from the upper condensing passage 112 can be guided to the discharge passage 114, thereby preventing the open end of the lower condensing passage 112 from being sealed by a liquid film.

The gas guide passage 113 and discharge passage 114 may be provided with a reinforcing member as needed for improving pressure characteristics; the material and the location should be selected in consideration of providing a lower gas or liquid flow resistance, uniform distribution of gas, liquid discharging property, etc.

The oxygen chamber 56 may have a structure similar to those of the previous embodiments, and the liquid supplying mechanism and liquid return mechanism are not restricted to those shown in FIGS. 14 through 18, but may be replaced with those employed in the previous embodiments.

Constructing the oxygen chamber 56 and nitrogen chamber 57 in the above manner can minimize any elevation in boiling point of liquid oxygen LO due to liquid head pressure at the side of the oxygen chamber 56, as well as a reduction in the degree of heat exchange due to an increase in the liquid film thickness at the side of the nitrogen chamber 57. Accordingly, the entire heat exchanging area of the condenser-evaporator 110 can be utilized for boiling and condensation with a high heat exchange characteristic. Since the heat exchanging characteristics in the up-and-down direction can be set substantially the same, the height of the condenser-evaporator 10 can be freely set, so that the performance can be increased by increasing the height, thus assuring a large double column rectifier without increasing the diameter of the vessel in which the condenser-evaporator is arranged. Further, improving the heat exchanging characteristics can decrease the temperature difference between the fluid on the condensation side and the fluid on the evaporation side, thus reducing the pressure of a lower column or the consumption of power of a compressor for compressing a raw gas.

Referring now to FIGS. 19 through 22, an embodiment is disclosed in which the above condenser-evaporator is assembled in a double column rectifier.

Figure 20:
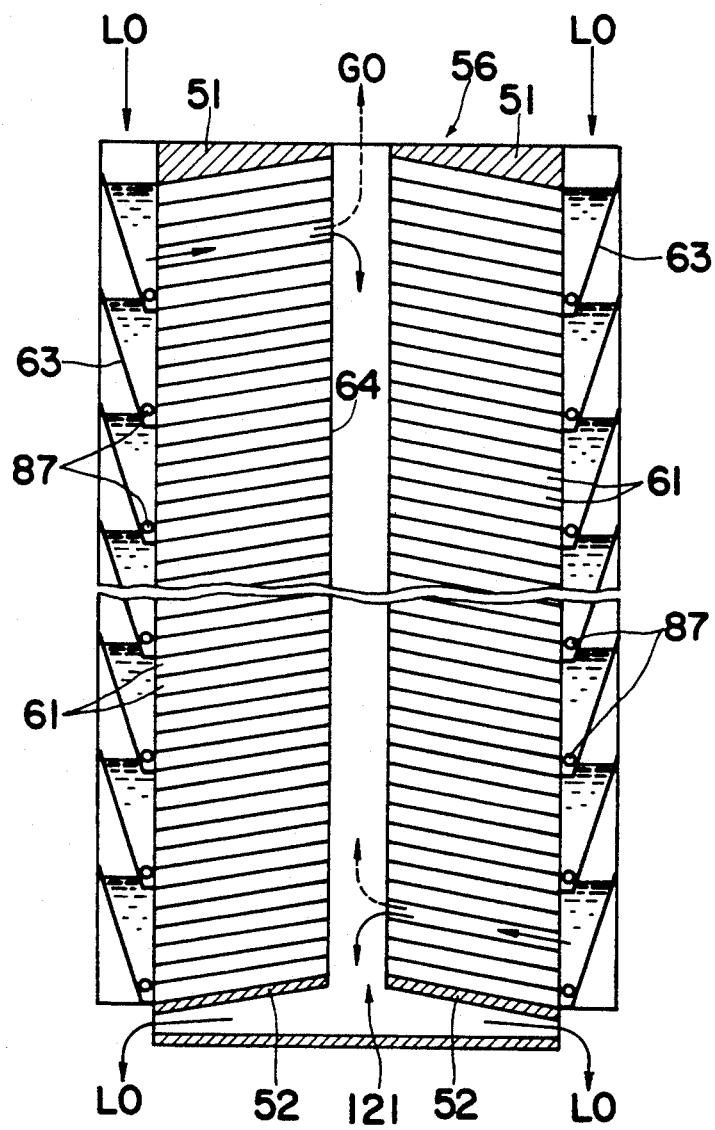
Figure 21:
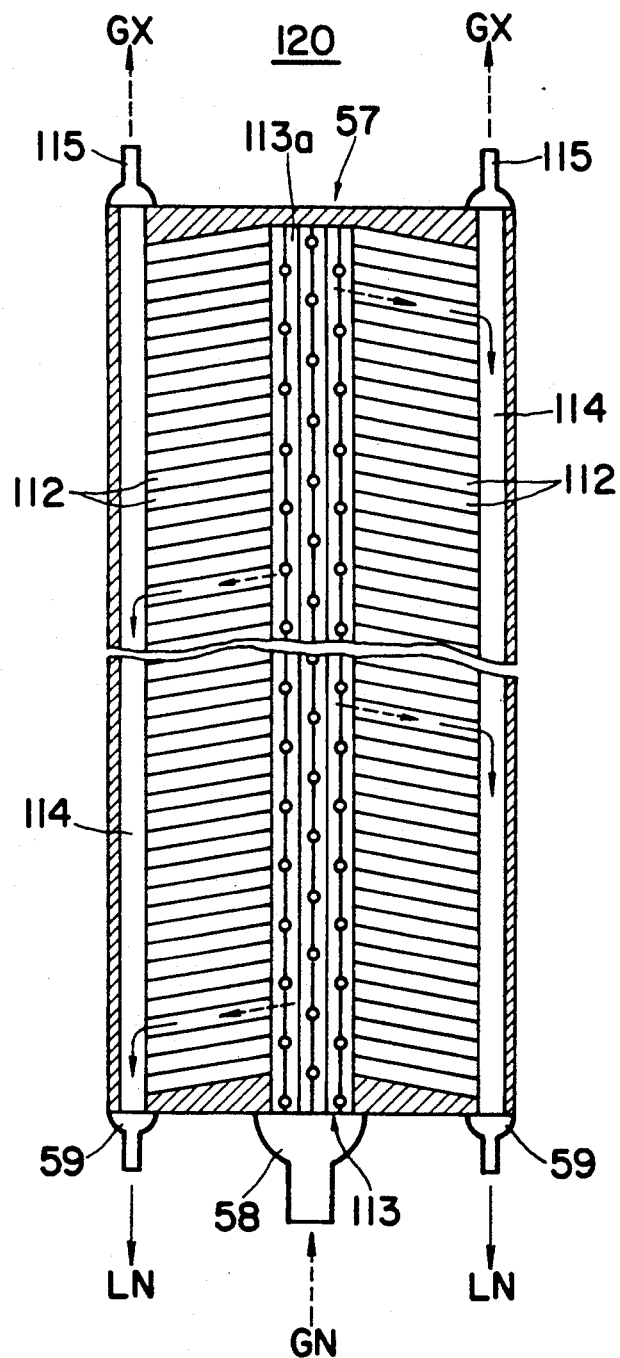
Figure 22:
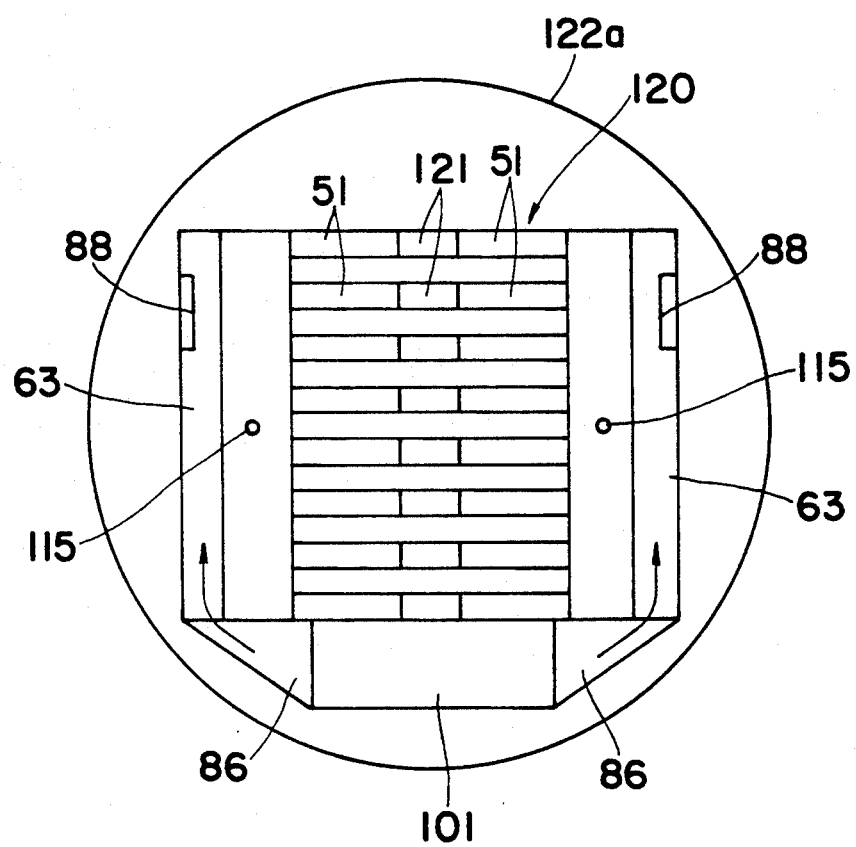

A condenser-evaporator 120 according to this embodiment is designed to have two condenser-evaporators 110 of the previous embodiment combined to face each other. An oxygen chamber 56 has liquid reservoirs 63 at both side portions of the condenser-evaporator 120 and a discharge passage 121 for oxygen gas and liquid oxygen formed at the center portion, as shown in FIG. 20. A nitrogen chamber 57 has a gas guide passage 113 at the center portion between facing condensing passages 112 and 112, and also has a discharge passage 114 provided outside each condensing passage 112, with headers 58 and 59 being respectively coupled to the passages 113 and 114, as shown in FIG. 21. The gas guide passage 113 is provided with a reinforcing member 113a such as perforated corrugation fins having many holes bored therein. If the condenser-evaporator 120 is tall, an inlet header may also be provided at the top of the condenser-evaporator 120 to introduce nitrogen gas GN into the gas guide passage 113, thus averaging the amount of nitrogen gas GN to be supplied.

The above-described condenser-evaporator 120 is disposed within a space at the upper portion of a partition wall 122c for defining an upper column 122a and a lower column 122b of the double column rectifier, i.e., at the bottom of the upper column 122a, to permit the liquid oxygen LO from the upper column 122a to be heat-exchanged with nitrogen gas GN from the lower column 122b.

The supply of liquid oxygen LO to this condenser-evaporator 120 is done by supplying the liquid oxygen LO from a lowermost tray 123 in the upper column through a flow conduit 124 to a liquid oxygen receiver 101 provided at the top of the condenser-evaporator and supplying circulating liquid oxygen LO to the receiver 101 through a liquid elevating conduit 125. The liquid oxygen LO supplied to the liquid oxygen receiver 101 is introduced through the individual liquid reservoirs 63 to the individual liquid passages 61 from liquid supply conduits 86, which are coupled to the receiver 101 and provided at both sides of the condenser-evaporator 120. The liquid oxygen LO in the liquid passages 61 is partially evaporated into oxygen gas GO as in the previous embodiments. A two-phase fluid of the liquid oxygen LO and oxygen gas GO, having reached an outlet 64 of the liquid passage 61 is separated out there as oxygen gas GO and liquid oxygen LO. The oxygen gas GO rises in the discharge passage 121. The liquid oxygen LO flows down along the discharge passage 121 to be retained in the liquid oxygen reservoir 126 under the condenser-evaporator 120, and is then led out from the conduit 127, a portion becoming a product and the other portion circulating back to the liquid elevating conduit.

The nitrogen gas GN at the top of the lower column 122b is partially extracted as a product and the remaining portion rises through a guide portion 129 at the inner periphery provided in a double-tube guide conduit 128 and is introduced in each condensing passage 112 through the gas guide passage 113 at the center of the nitrogen chamber 57 from the inlet header 58. The nitrogen gas GN led into the condensing passage 112 is condensed as in the previous embodiments, as liquid nitrogen LN, which then flows toward the discharge passages 114 on both sides. This liquid nitrogen LN flows through the discharge passages 114 via an outlet header 59 and is led out from the conduit 131 through a discharge portion 130 at the periphery of the conduit 128, a portion of the liquid nitrogen being extracted as a product and the remaining portion becoming a reflux liquid in the upper column 122a and lower column 122b. Non-condensed gas GX is led out from a purge nozzle 115 as described earlier.

As the liquid passages 61 and condensing passages 112 for two blocks of the condenser-evaporator 110 of the above embodiment are integratedly arranged face-to-face, piping required for assembling the condenser-evaporator into the double column rectifier 122 can be reduced, thus reducing the manufacturing and assembling costs.

The condenser-evaporator 120 is operated while measuring the amount of liquid oxygen LO retained in the liquid oxygen reservoir 126 with a level meter 132 or the like.

Figure 23:
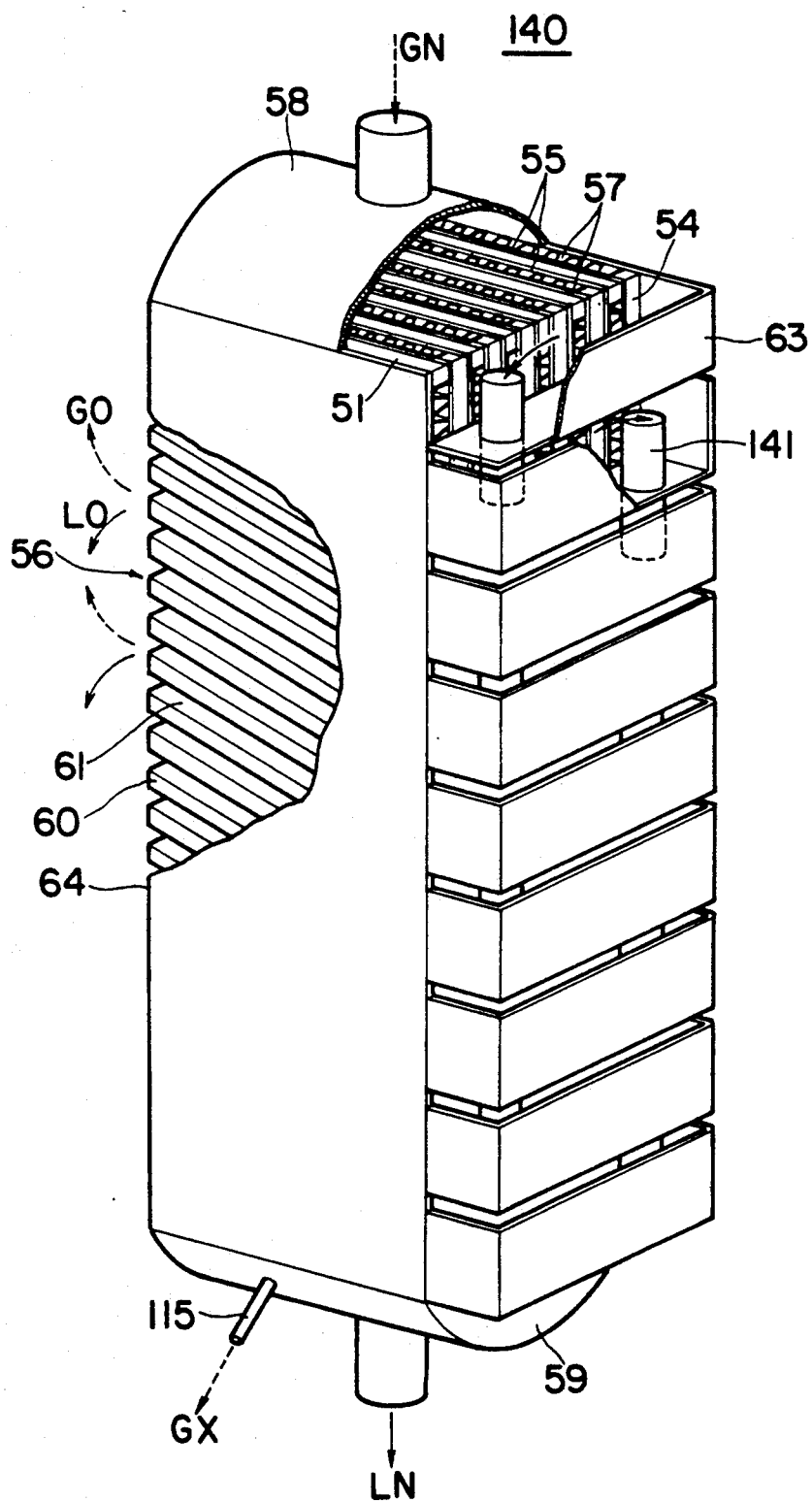
FIGS. 23 and 24 illustrate the seventh embodiment, the former being a partly cutaway perspective view of a condenser-evaporator and the latter being a cross-sectional view of an oxygen chamber serving as a first fluid chamber.
Figure 24:
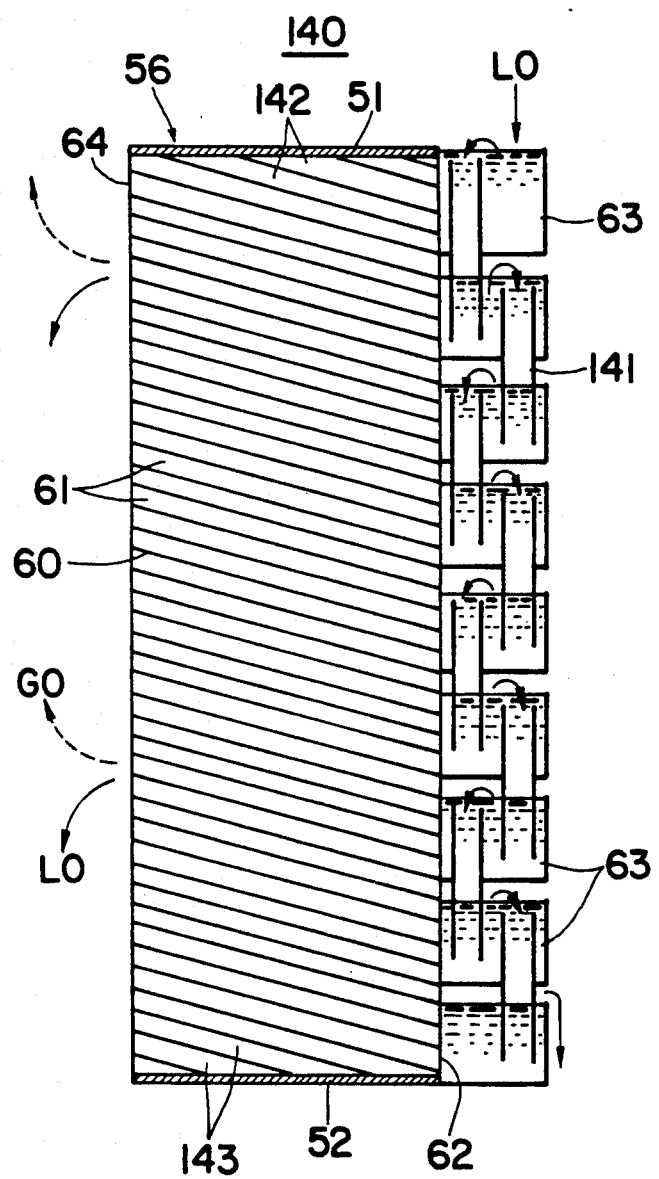

A condenser-evaporator 140, as illustrated in FIGS. 23 and 24, is the seventh embodiment of this invention, and has a plurality of liquid reservoirs 63 provided in up-and-down multiple stages at one side portion, the reservoirs communicating with the oxygen chamber 56.

This oxygen chamber 56 has one end of a liquid passage 61 communicating with the liquid reservoir 63 and an outlet 64 at the other end being open so as to serve as a gas outlet for oxygen gas GO. The individual liquid reservoirs 63, excluding the one at the lowermost stage, are provided with an overflow conduit 141 to permit liquid oxygen LO to sequentially flow to lower liquid reservoirs 63.

Part of the liquid oxygen LO introduced in the uppermost liquid reservoir 63 flows in the liquid passage 61 and is partly evaporated to be bubbles of oxygen gas GO. After the bubbles rise together with the liquid oxygen LO through the liquid passage 61, they are separated from the liquid oxygen LO at the outlet 64 and rise thereafter. The liquid oxygen LO which has not been evaporated flows to the downward position of the condenser-evaporator 140 directly.

The remaining liquid oxygen LO in the liquid reservoir 63 sequentially flows down through the overflow conduit 141 to the individual liquid passages 61, and overflows from the side wall of the liquid reservoir 63 at the lowermost stage to flow further downward. Since the liquid passages 142 and 143 at the uppermost and lowermost portions each have their one end closed, it is desirable that perforated plates permitting communication between the liquid passages 142 and 143 are used as the heat exchanger plates for those portions to prevent stagnation of oxygen gas GO.

Figure 25:
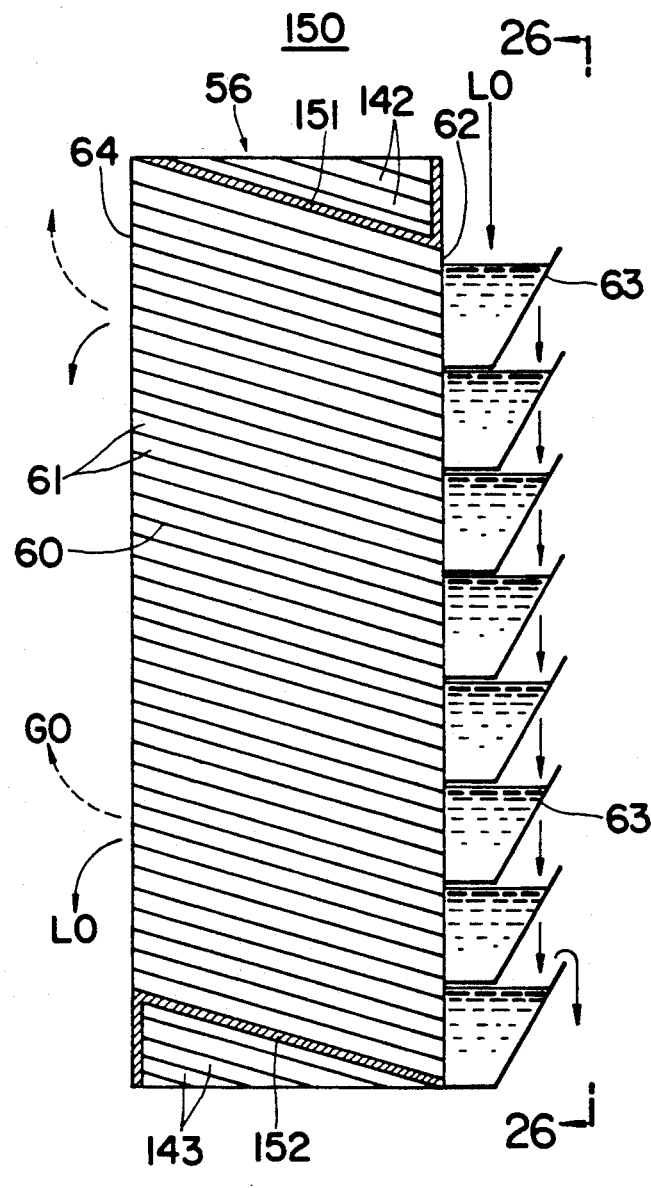
FIGS. 25 and 26 illustrate the eighth embodiment of this invention, the former being a cross-sectional view of an oxygen chamber and the latter being a diagram as viewed from the arrow 26—26 of FIG. 25.
Figure 26:
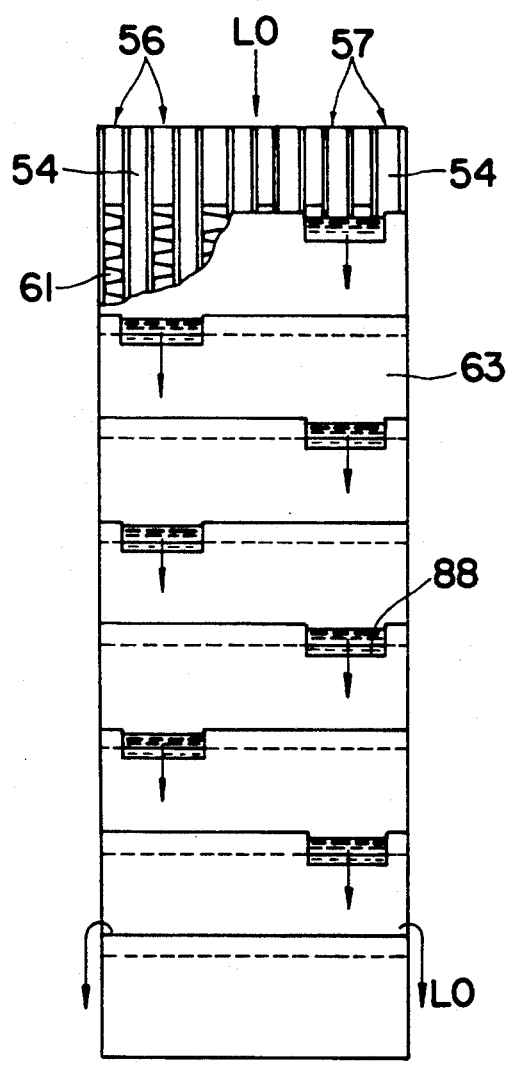

A condenser-evaporator 150 according to the eighth embodiment shown in FIGS. 25 and 26 has an oxygen chamber 56 in which slant bars 151 and 152 for closing the uppermost and lowermost liquid passages 142 and 143 are provided. These portions communicate with a nitrogen chamber 57 to prevent stagnation of oxygen gas GO, and a weir 88 is formed at the top of the liquid reservoir 63 to permit liquid oxygen LO to sequentially flow down to lower liquid reservoirs 63 from weir 88 in place of the overflow conduit 141.

Figure 27:
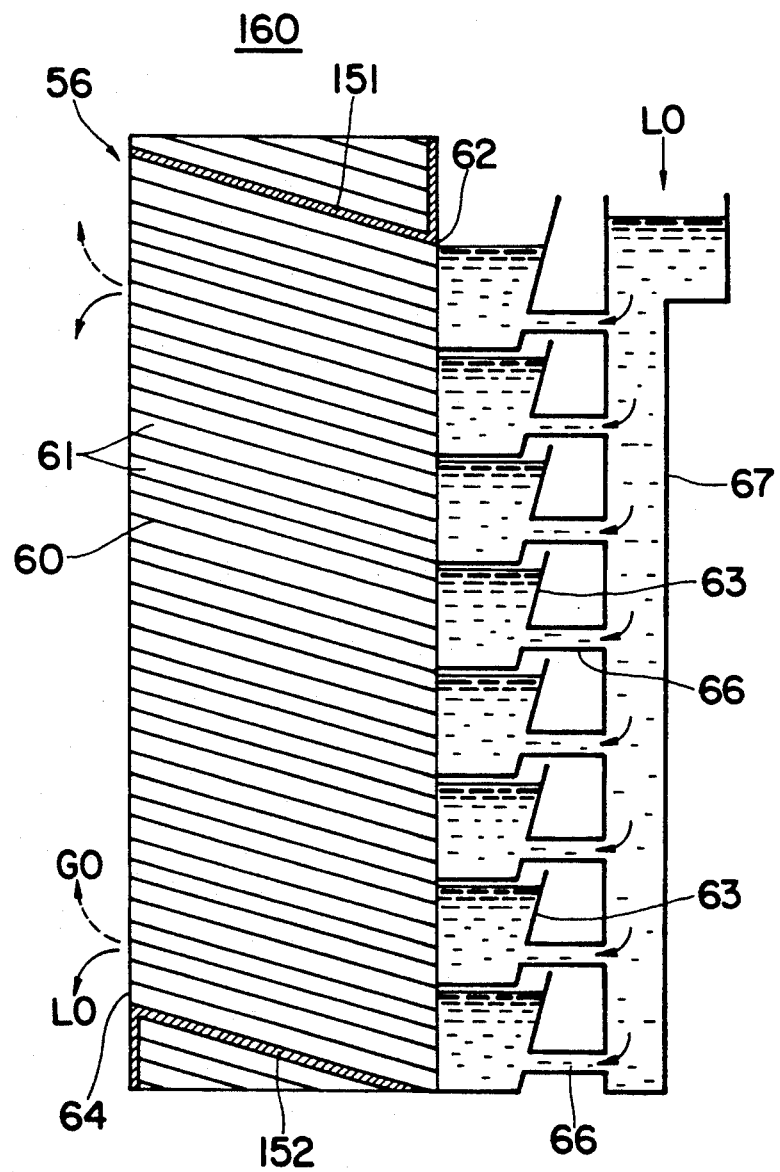
FIG. 27 is a cross-sectional view of an oxygen chamber according to the ninth embodiment of this invention.

FIG. 27 illustrates a ninth embodiment of the present invention which is a condenser-evaporator 160 having a manifold 67 with a communicating conduit 66 provided as means for supplying liquid oxygen LO to each liquid reservoir 63. To prevent a variation in the amount of liquid oxygen LO to be supplied to the individual liquid reservoirs 63 due to a liquid head in the manifold 67, and to evenly distribute the liquid oxygen LO, the cross sectional area of the communicating conduit 66 is determined by an amount corresponding to the level difference in the liquid head. Further, an overflow from the liquid reservoir 63 and the communicating conduit 66 may be combined as means for supplying liquid to the liquid reservoirs 63.

Figure 28:
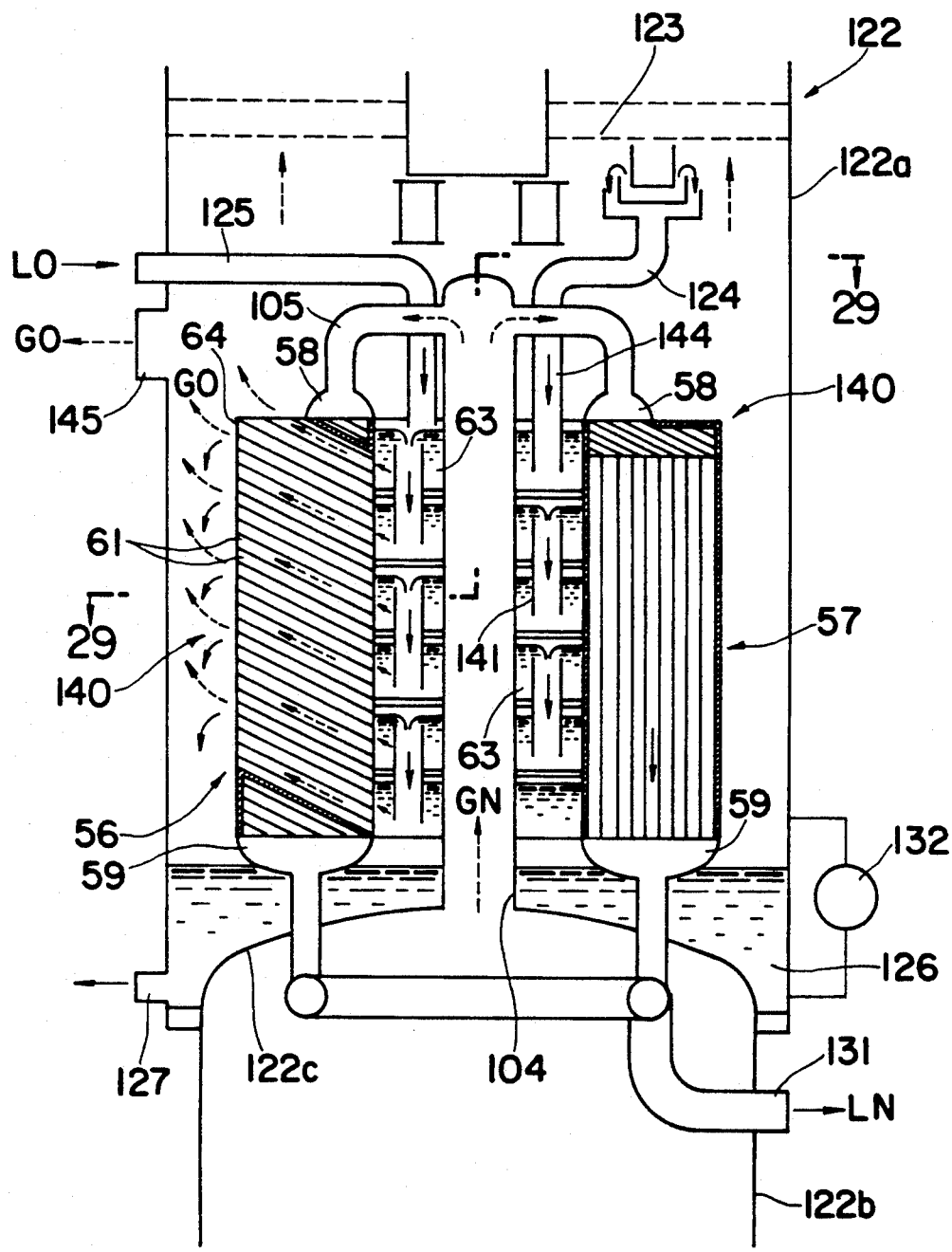
FIGS. 28 and 29 illustrate that the condenser-evaporator according to the seventh embodiment is assembled in a double column rectifier, the former being a cross-sectional view of the essential section of the double column rectifier and the latter being a cross section taken along 29—29 of FIG. 28.
Figure 29:
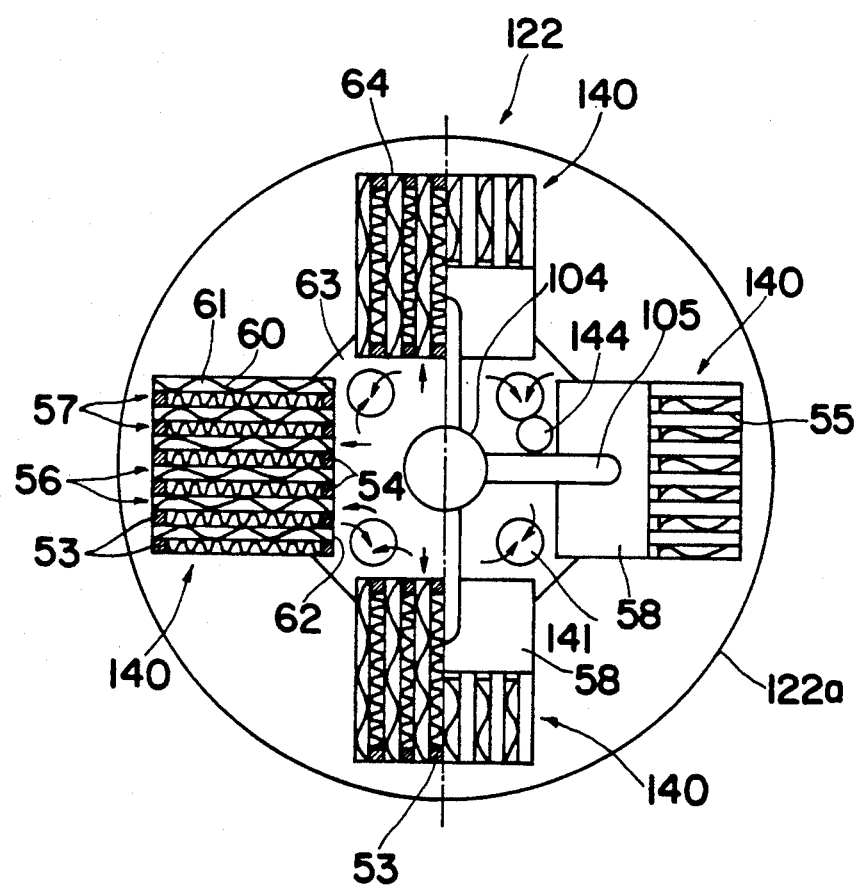

FIGS. 28 and 29 illustrate an example of assembling the condenser-evaporator 140 according to the seventh embodiment into a double column rectifier 122. Four condenser-evaporators 140 are arranged face to face on the circumference with a nitrogen gas elevating conduit 104 at the center, the conduit 104 lying on a partition plate 122c for defining an upper column 122a and a lower column 122b of the double column rectifier 122. Between each condenser-evaporator 140 and the nitrogen gas elevating conduit 104 are provided liquid reservoirs 63 which communicate with each stage, with a liquid oxygen guide conduit 144 being inserted in the uppermost liquid reservoir 63.

Nitrogen gas GN rises through the conduit 104 from the lower column 122b, and it is then led into the nitrogen chamber 57 from each inlet header 58 and is heat-exchanged with liquid oxygen LO of the oxygen chamber 56 to be a condensed liquid. This liquid is collected in an outlet header 59 and is led out from a lower conduit 131.

The liquid oxygen LO flowing in the uppermost liquid reservoir 63 of the condenser-evaporator 140 from the upper column 122a, partially flows in the liquid passages 61 of the oxygen chamber 56 and is heat-exchanged with the nitrogen gas GN of the nitrogen chamber 57 and evaporated. The resulting oxygen gas GO flows through the liquid passage 61 and is led out from the outlet 64 as rising gas in the upper column 122a, while part of it is extracted as product oxygen gas GO from a pipe 145. Excess liquid oxygen LO which is not evaporated flows down from the outlet 64 of the liquid passage 61, is pored and retained on the partition 122c, and is led out from the conduit 127. Part of the liquid oxygen LO is extracted as a product, while the remaining portion is elevated by a liquid oxygen pump or thermosiphon reboiler or the like and circulates from the upper conduit 125 again to the liquid reservoir 63.

A shallow depth heat exchange of liquid oxygen LO can prevent the boiling point from rising due to the liquid head pressure and can lower the condensation temperature of nitrogen gas GN to reduce the operational pressure of the lower column 122b, thus reducing the power consumption of the raw air compressor. Since the condenser-evaporator 140 can be made taller to increase the heat exchanging area, a condenser-evaporator with high performance can be set within the internal space of the rectifier, thus facilitating assembly of the double column rectifier 122 without a diameter increase of the vessel. Further, condensation and evaporation occur at the instant liquefied gas flowing from the upper column 122a is introduced at the time of start up, thus significantly shortening the start up period and reducing the power consumption during this period. Although the condenser-evaporators according to the seventh eighth and ninth embodiments disclose a large capacity liquid circulating pump or thermosiphon reboiler as compared with the condenser-evaporators according to the first five embodiments, they have a simpler structure and are safer.

The present condenser-evaporator can have the same results as are obtained by evaporation and condensation caused by heat exchange between liquid oxygen and nitrogen gas in air separation, even in a different case which involves different liquid and fluid.

Industrial Applicability

The present condenser-evaporator is particularly suitable to a condenser-evaporator for use in a large cryogenic air separation plant which involves a great amount of processing, can be made compact and reduce the operational power consumption, and can reduce the power unit of a product.

What is claimed is:
1. A condenser-evaporator comprising:
   first fluid chambers and second fluid chambers alternately formed by multiple vertical partitions, a liquid in said first fluid chambers being heat-exchanged with a fluid in said second fluid chambers;
   a plurality of heat exchanger plates arranged in up-and-down multiple stages in said first fluid chambers to form a plurality of liquid passages each having one end open; and
   a plurality of liquid reservoirs each being in fluid communication with only one side of each said liquid passage with the open end on the other side of each said liquid passage, wherein fluid is supplied from said liquid reservoir to each said liquid passage in the first fluid chambers and a part of the supplied fluid is evaporated, while unevaporated fluid flows out from the open end of each said liquid passage.

2. A condenser-evaporator according to claim 1, wherein said liquid reservoirs are provided for a plurality of liquid passages sequentially provided in an up-and-down direction as one passage block.

3. A condenser-evaporator comprising:

first fluid chambers and second fluid chambers alternately formed by multiple vertical partitions, a liquid in said first fluid chambers being heat-exchanged with a fluid in said second fluid chambers;

a plurality of heat exchanger plates arranged in up-and-down multiple stages in said first fluid chambers to form a liquid passage having one end open;

a plurality of liquid reservoirs communicating with said liquid passage, having a top open and provided in up-and-down multiple stages on a side of the other end of said liquid passage;

a plurality of liquid receivers, provided in up-and-down multiple stages, for receiving a liquid flowing down from said ends of said liquid passages; and a liquid return passage for returning a liquid in said liquid receivers to said liquid reservoirs, whereby a liquid is introduced in said liquid passage for heat exchange while being supplied to said liquid reservoir and/or liquid receivers in each stage.

4. A condenser-evaporator according to claim 1 or 3, wherein said liquid passages have an upward inclination going from one end of the side of said liquid reservoirs toward a tip of the other end on the open side.

5. A condenser-evaporator according to claim 3, wherein said liquid reservoirs and receivers are provided for a plurality of liquid passages sequentially provided in an up-and-down direction as one passage block.

6. A condenser-evaporator according to claim 3, wherein a plurality of partition rods are provided in parallel to said heat exchanger plates for predetermined intervals of said heat exchanger plates disposed in said first fluid chambers to separate said passage into passage blocks including a plurality of passages in a vertical direction, liquid reservoirs and/or liquid receivers are provided for each of said passage blocks, and bottom plates of said liquid reservoirs and/or liquid receivers are connected to end portions of said partition rods.

7. A condenser-evaporator according to claim 5 or 6, wherein a liquid passage located at an upper portion in said each passage block serves as a return passage for returning a liquid from said liquid receivers to said liquid reservoirs.

8. A condenser-evaporator according to claim 3, wherein said return passage is a conduit or a gutter with a part open upward for connecting said liquid receivers and said liquid reservoirs.

9. A condenser-evaporator according to claim 3, wherein said return passage is formed between said first fluid chambers or in a chamber formed adjacent to an outside of an outermost one of said first fluid chambers, by a passage defined by disposing a partition rod for providing communication between the bottom plate of said liquid receiver and that of said liquid reservoir.

10. A condenser-evaporator according to claim 3, wherein a liquid supply conduit is disposed along said liquid reservoirs and/or liquid receivers provided in up-and-down multiple stages, and said liquid supply conduit communicates with said liquid reservoirs and/or said liquid receivers through liquid supply holes formed in side walls of said liquid reservoirs and/or liquid receivers.

11. A condenser-evaporator comprising:
first fluid chambers and second fluid chambers alternately formed by multiple vertical partitions, a liquid in said first fluid chambers being heat-exchanged with a fluid in said second fluid chambers;

a plurality of heat exchanger plates arranged in up-and-down multiple stages in said first fluid chambers to form first liquid passages having an upward inclination from one end of said condenser-evaporator to the other end thereof and second liquid passages having an inclination rising form said other end of said condenser-evaporator to one end thereof in an opposite direction to that of said inclination of said first liquid passages;

a plurality of liquid reservoirs communicating with individual liquid passages, having a top open and provided in up-and-down multiple stages at lower ends of said first and second liquid passages; and a plurality of discrete liquid receives communicating with individual liquid passages, having a top open and provided in up-and-down multiple stages at upper ends of said first and second liquid passages, whereby a liquid flowing down in said liquid receivers from one end of said liquid passages is supplied to said liquid reservoirs of the other liquid passages.

12. A condenser-evaporator according to claim 11, wherein said first liquid passages and said second liquid passages are grouped into a first liquid passage group and a second liquid passage group.

13. A condenser-evaporator comprising:
first fluid chambers and second fluid chambers alternately formed by multiple vertical partitions;

a plurality of heat exchanger plates arranged in up-and-down multiple stages in said first fluid chambers to form a plurality of liquid passages;

a plurality of liquid reservoirs communicating with said liquid passages and provided in up-and-down multiple stages at one end side of said liquid passages;

a plurality of condenser-evaporator blocks for introducing a liquid in said liquid passages while supplying said liquid to said liquid reservoirs at individual stages to be heat-exchanged with a fluid in said second fluid chambers;

a plurality of discrete liquid receives communicating with individual liquid passages and provided in up-and-down multiple stages at the other end side of said liquid passages, for receiving a liquid flowing down from one end of said liquid passages; and a liquid supply passage for permitting a liquid to flow from said liquid receivers to said liquid reservoirs of another condenser-evaporator block.

14. A condenser-evaporator according to claim 13, wherein said condenser-evaporator blocks are arranged on the same circumference.

15. A condenser-evaporator according to claim 13, wherein said liquid supply passage is a conduit or a gutter with a part open upward, provided between said liquid receivers and said liquid reservoirs.

16. A condenser-evaporator comprising:
first fluid chambers and second fluid chambers alternately defined by many vertical partitions, a liquid in said first fluid chambers being heat-exchanged with a gas fluid in said second fluid chambers;

a plurality of heat exchanger plates provided in said first fluid chambers in up-and-down multiple stages to form a plurality of liquid passages;

a plurality of liquid reservoirs communicating with said liquid passages to introduce a liquid, having a top open and provided at only one end of said liquid passages in up-and-down multiple stages, with the other end of said liquid passages being open;

a plurality of heat exchanger plates disposed in said second fluid chambers in such a way as to have a downward inclination with respect to a flowing direction of said gas fluid to thereby form a plurality of gas passages;

a gas guide passage provided close to an inlet side of said gas passages; and a discharge passage provided close to an outlet side of said gas passages.

17. A condenser-evaporator according to claim 16, wherein discharge passages for evaporation gas and non-evaporated liquid are provided close to an outlet end of said liquid passages on said open side. said liquid passages on said open side.

* * * * *